United States Patent
Jung et al.

(10) Patent No.: US 10,721,679 B2
(45) Date of Patent: *Jul. 21, 2020

(54) METHOD FOR TRANSMITTING AND RECEIVING SIGNALS IN PROXIMITY NETWORK AND ELECTRONIC DEVICE THEREOF

(71) Applicant: Samsung Electronics Co., Ltd., Gyeonggi-do (KR)

(72) Inventors: Bu-Seop Jung, Gyeonggi-do (KR); Young-Kwan Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,533

(22) Filed: May 7, 2019

(65) Prior Publication Data

US 2019/0268834 A1    Aug. 29, 2019

Related U.S. Application Data

(63) Continuation of application No. 14/933,736, filed on Nov. 5, 2015, now Pat. No. 10,313,961.

(30) Foreign Application Priority Data

Nov. 25, 2014  (KR) .................. 10-2014-0165416

(51) Int. Cl.
*H04W 48/16*  (2009.01)
*H04W 52/02*  (2009.01)
(Continued)

(52) U.S. Cl.
CPC ............. *H04W 48/16* (2013.01); *H04L 67/18* (2013.01); *H04W 8/005* (2013.01);
(Continued)

(58) Field of Classification Search
CPC ............................. H04W 8/005; H04L 67/18
See application file for complete search history.

(56) References Cited

U.S. PATENT DOCUMENTS

| 10,178,669 B2 | 1/2019 | Du et al. |
| 2009/0323648 A1 | 12/2009 | Park et al. |
| (Continued) | | |

FOREIGN PATENT DOCUMENTS

| CN | 104053227 | 9/2014 |
| CN | 104160678 | 11/2014 |
| (Continued) | | |

OTHER PUBLICATIONS

Chinese Office Action dated Sep. 29, 2019 issued in counterpart application No. 201580060756.8, 18 pages.

(Continued)

*Primary Examiner* — Yemane Mesfin
*Assistant Examiner* — Henry Baron
(74) *Attorney, Agent, or Firm* — The Farrell Law Firm, P.C.

(57) ABSTRACT

A method of an electronic device, the electronic device, and a chipset of the electronic device are provided. The method of the electronic device includes, while the electronic device operates as a master of the NAN cluster based on a first master preference, transmitting discovery signals outside of DWs by using the Wi-Fi communication circuitry; while transmitting the discovery signals outside of the DWs, determining to switch a state of the processor from a wake-up state to a sleep state; based on the determination, changing control information for the NAN cluster by using the processor that is in the wake-up state, wherein the changed control information for the NAN cluster includes data regarding a second master preference distinct from the first master preference; after providing the changed control (Continued)

information to the Wi-Fi communication circuitry by using the processor, switching the state of the processor to the sleep state; and while the processor is in the sleep state switched from the wake-up state, transmitting the changed control information that includes the data regarding the second master preference by using the Wi-Fi communication circuitry.

20 Claims, 22 Drawing Sheets

(51) Int. Cl.
*H04W 8/00* (2009.01)
*H04L 29/08* (2006.01)
*H04L 12/24* (2006.01)
*H04W 84/20* (2009.01)
*H04L 12/12* (2006.01)

(52) U.S. Cl.
CPC ......... *H04W 52/0209* (2013.01); *H04L 12/12* (2013.01); *H04L 41/0803* (2013.01); *H04L 67/16* (2013.01); *H04W 84/20* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/22* (2018.01); *Y02D 70/26* (2018.01)

(56) References Cited

U.S. PATENT DOCUMENTS

| | | |
|---|---|---|
| 2013/0185373 A1 | 7/2013 | Vandwalle et al. |
| 2013/0308520 A1 | 11/2013 | Damnjanovic et al. |
| 2014/0254569 A1 | 9/2014 | Abraham et al. |
| 2014/0293851 A1 | 10/2014 | Abraham et al. |
| 2014/0313966 A1 | 10/2014 | Shukla et al. |
| 2015/0319675 A1 | 11/2015 | Park |
| 2015/0341811 A1 | 11/2015 | Deshpande |
| 2017/0026991 A1* | 1/2017 | Oren ................. H04L 45/20 |

FOREIGN PATENT DOCUMENTS

| | | |
|---|---|---|
| WO | WO 2014/113076 | 7/2014 |
| WO | WO 2014/130153 | 8/2014 |
| WO | WO 2014/168412 | 10/2014 |

OTHER PUBLICATIONS

European Search Report dated Dec. 19, 2016 issued in counterpart application No. 15196117.4-1854, 10 pages.
Wi-Fi Alliance Association, "Neighbor Awareness Networking Technical Specification", Version 1.0, May 1, 2015, 98 pages.
Daniel Camps-Mur et al., "Enabling Always on Service Discovery: WiFi Neighbor Awareness Networking", IEEE Wireless Communications, Apr. 1, 2015, 8 pages.
International Search Report dated Mar. 9, 2016 issued in counterpart application No. PCT/KR2015/012607, 19 pages.
European Search Report dated Apr. 1, 2016 issued in counterpart application No. 15196117.4-1854, 10 pages.

* cited by examiner

METHOD FOR TRANSMITTING AND RECEIVING SIGNALS IN PROXIMITY NETWORK AND ELECTRONIC DEVICE THEREOF

PRIORITY

This application is a Continuation of U.S. application Ser. No. 14/933,736, which was filed in the U.S. Patent and Trademark Office on Nov. 5, 2015, and claims priority under 35 U.S.C. § 119(a) to a Korean Patent Application Serial No. 10-2014-0165416, which was filed in the Korean Intellectual Property Office on Nov. 25, 2014, the entire content of each of which is incorporated herein by reference.

BACKGROUND

1. Field of the Disclosure

The present disclosure relates generally to a proximity network, and more particularly, to an apparatus and a method for configuring a proximity network in an electronic device.

2. Description of the Related Art

Recently, various proximity-based services utilizing short-range communication technology have been developed. Accordingly, a connection between physically neighboring devices may be configured, and a service for rapidly exchanging data may be provided. For example, the utilization of low energy proximity communication using a Bluetooth low energy (BLE) beacon, and neighbor awareness networking (NAN) technology based on a wireless local area network (LAN) have been suggested.

A proximity-based service has a dynamically changing network. For example, a group of devices in a network may be referred to as a "cluster." For a device to join a cluster, a signal indicating the existence of other devices or a cluster must be transmitted. Therefore, the device, which does not belong to the cluster, may detect the signal to thereby join the cluster.

As described above, in order to configure a proximity service-based network, it is required to transmit signals for discovering a cluster. In this case, all of or some of the devices in a cluster, which has been configured, may transmit signals for discovering a cluster. In the case where some devices transmit signals for discovering a cluster, at least one device that transmits a signal for discovering a cluster may experience relatively high power consumption, and may be restricted in performing another operation due to the transmission of the signal.

SUMMARY

An aspect of the present disclosure provides an apparatus and a method, which effectively configure a proximity network in an electronic device.

Another aspect of the present disclosure provides an apparatus and a method, which control the transmission of signals for discovery in an electronic device.

Another aspect of the present disclosure provides an apparatus and a method, which control a role of transmitting signals for discovery in an electronic device.

Another aspect of the present disclosure provides an apparatus and a method, which adjust information on a determination of a role of transmitting signals for discovery in an electronic device.

Another aspect of the present disclosure provides an apparatus and a method, which control a function of transmitting signals for discovery in an electronic device.

Another aspect of the present disclosure provides an electronic device that may not operate as a master, or may not execute some functions of a master in consideration of circumstances of the electronic device, or the electronic device may effectively perform a post operation, in addition to a communication in a cluster in a proximity network, by adjusting a channel for the post operation.

In accordance with an aspect of the present disclosure, an electronic device is provided for use in a neighbor awareness networking (NAN) cluster. The electronic device includes a wireless fidelity (Wi-Fi) communication circuitry; a memory configured to store instructions; and a processor configured to execute the instructions, which instruct the processor to while the electronic device operates as a master of the NAN cluster based on a first master preference, control the Wi-Fi communication circuitry to transmit discovery signals outside of discovery windows (DWs), while transmitting the discovery signals outside of the DWs, determine to switch a state of the processor from a wake-up state to a sleep state, based on the determination, change control information for the NAN cluster, wherein the changed control information for the NAN cluster includes data regarding a second master preference that is distinct from the first master preference, and after providing the changed control information to the Wi-Fi communication circuitry, switch the state of the processor to the sleep state. The Wi-Fi communication circuitry is configured to while the processor is in the sleep state switched from the wake-up state, transmit the changed control information that includes the data regarding the second master preference.

In accordance with another aspect of the present disclosure, a method is provided for an electronic device including a processor and a wireless fidelity (Wi-Fi) communication circuitry in a neighbor awareness networking (NAN) cluster. The method includes while the electronic device operates as a master of the NAN cluster based on a first master preference, transmitting discovery signals outside of discovery windows (DWs) by using the Wi-Fi communication circuitry; while transmitting the discovery signals outside of the DWs, determining to switch a state of the processor from a wake-up state to a sleep state; based on the determination, changing control information for the NAN cluster by using the processor that is in the wake-up state, wherein the changed control information for the NAN cluster includes data regarding a second master preference distinct from the first master preference; after providing the changed control information to the Wi-Fi communication circuitry by using the processor, switching the state of the processor to the sleep state; and while the processor is in the sleep state switched from the wake-up state, transmitting the changed control information that includes the data regarding the second master preference by using the Wi-Fi communication circuitry.

In accordance with another aspect of the present disclosure, a non-transitory computer readable medium is provided storing one or more programs, the one or more programs comprising instruction which, when executed by an electronic device with a wireless fidelity (Wi-Fi) communication circuitry and a processor, cause the electronic device to while the electronic device operates as a master of the NAN cluster based on a first master preference, control the Wi-Fi communication circuitry to transmit discovery signals outside of discovery windows (DWs) by using the processor being in a wake-up state; while transmitting the discovery signals outside of the DWs, determine to switch a state of the processor from the wake-up state to a sleep state by using the processor being in the wake-up state; based on the determination, change control information for the NAN cluster by using the processor being in the wake-up state, wherein the changed control information for the NAN cluster includes data regarding a second master preference distinct from the first master preference; after providing the changed control information to the Wi-Fi communication circuitry, switch the state of the processor to the sleep state; and while the processor is in the sleep state switched from the wake-up state, transmitting the changed control information that includes the data regarding the second master preference by using the Wi-Fi communication circuitry.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
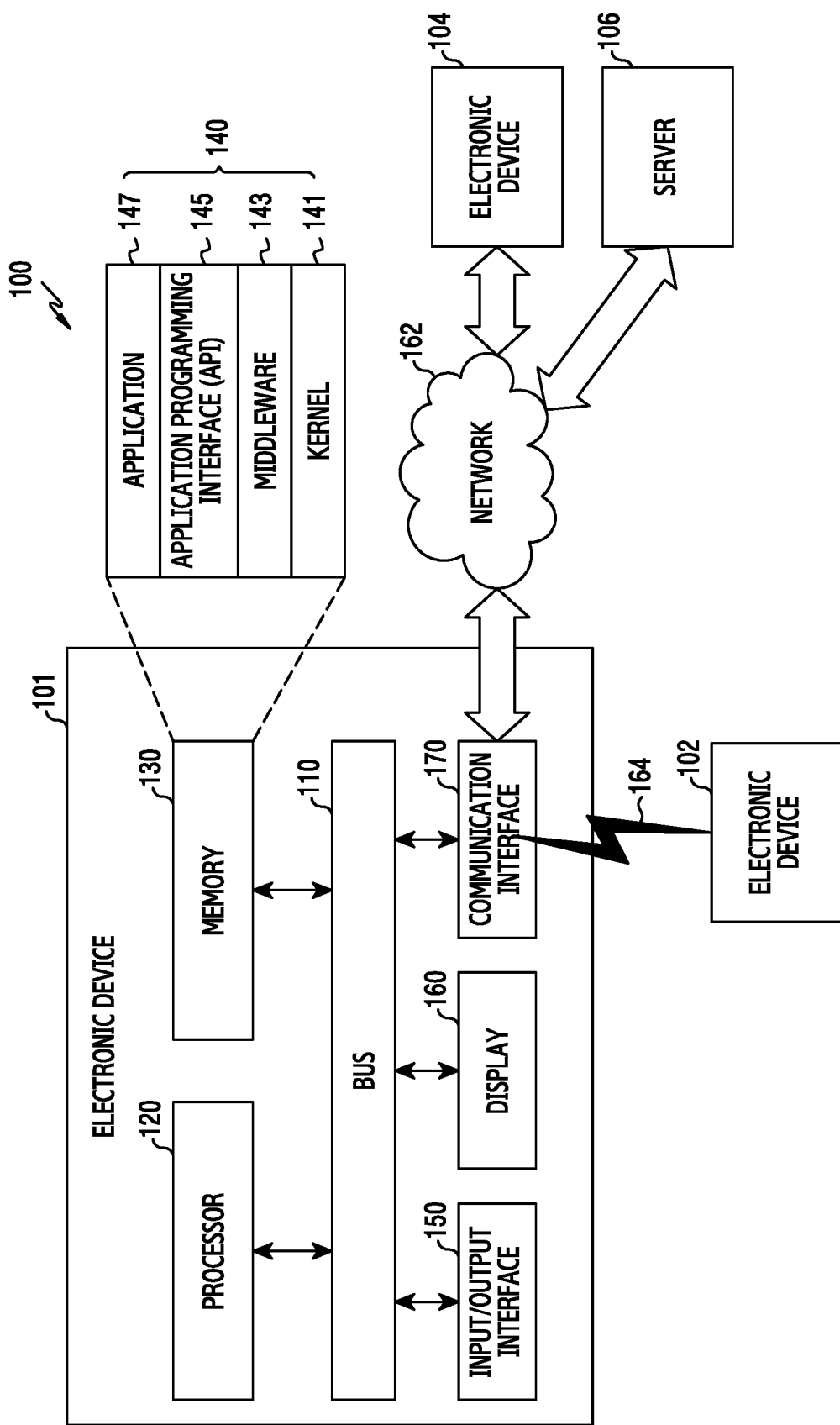
FIG. 1 is a block diagram of a network environment including an electronic device according to an embodiment of the present disclosure.

Hereinafter, the present disclosure is described in detail with reference to the accompanying drawings. In the following description of the present disclosure, a detailed description of known configurations or functions incorporated herein will be omitted when the detailed description may make the subject matter of the present disclosure unclear. The terms used herein are terms defined in consideration of the functions in the present disclosure, and may be different according to users, intentions of the users, or customs. Accordingly, the definitions of the terms used herein should be determined based on the context of an embodiment of the present disclosure.

Hereinafter, an apparatus for and a method of effectively configuring a proximity network in an electronic device are described.

Hereinafter, the terms referring to signals, information exchanged between devices, or devices and a group of devices are used as examples for convenience of explanation. Therefore, the present disclosure should not be interpreted as being limited to the terms used herein, and other terms having the equivalent technical meanings thereto may be used.

The terms "unit," and "device" used hereinafter refer to a unit that executes at least one function or operation, which may be implemented in hardware, software, or a combination thereof.

Hereinafter, for convenience of explanation, the terms which are defined in the wireless fidelity (WiFi) scheme as the standard of a wireless local area network (LAN) will be used in the present disclosure. However, the present disclosure is not limited to the terms of the WiFi scheme, but may be applied to systems according to other standards.

An embodiment of the present disclosure is described below with reference to the accompanying drawings. However, the present disclosure is not limited to an embodiment of the present disclosure, but should be construed as including a modification, an equivalent and/or an alternative of an embodiment of the present disclosure. In the descriptions of the accompanying drawings, similar reference numerals are used for similar elements.

The terms "have," "may have," "include," and "may include" used in the present disclosure indicate the presence of corresponding features (for example, elements such as numerical values, functions, operations, or parts), but do not preclude the presence of additional features.

The terms "A or B," "at least one of A and/or B," or "one or more of A and/or B" used in the present disclosure include all possible combinations of items enumerated with them. For example, "A or B," "at least one of A and B," and "at least one of A or B" indicates (1) including at least one A, (2) including at least one B, and (3) including both at least one A and at least one B.

The terms such as "first" and "second" used in an embodiment of the present disclosure may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope and spirit of an embodiment of the present disclosure, and similarly, a second element may be referred to as a first element.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The expression "configured to (or set to)" used in an embodiment of the present disclosure may be replaced with "suitable for," "having the capacity to," "designed to," "adapted to," "made to," or "capable of" according to the context. The term "configured to (set to)" does not necessarily indicate "specifically designed to" in hardware. Instead, the expression "apparatus configured to . . . " may indicate that the apparatus is "capable of . . . " along with other devices or parts in a certain context. For example, "a processor configured to (set to) perform A, B, and C" may indicate a dedicated processor (e.g., an embedded processor) for performing a corresponding operation, or a general-purpose processor (e.g., a central processing unit (CPU) or an application processor) capable of performing a corresponding operation by executing one or more software programs stored in a memory device.

The terms used in an embodiment of the present disclosure are for the purpose of describing an embodiment of the present disclosure and are not intended to limit the present disclosure. As used herein, the singular forms are intended to include the plural forms as well, unless the context clearly indicates otherwise. All of the terms used herein have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in an embodiment of the present disclosure. According to the circumstances, even the terms defined in an embodiment of the present disclosure should not be interpreted as excluding an embodiment of the present disclosure.

An electronic device according to an embodiment of the present disclosure may include at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a moving picture experts group audio layer 3 (MP3) player, a mobile medical machine, a camera, or a wearable device (for example, smart glasses, a head-mounted-device (HMD), electronic clothing, an electronic bracelet, an electronic necklace, an electronic appcessory, electronic tattoos, a smart mirror, or a smartwatch).

According to an embodiment of the present disclosure, an electronic device may be a smart home appliance. For example, a smart home appliance may include at least one of a television, a digital video disk (DVD) player, a stereo system, a refrigerator, an air conditioner, a cleaner, an oven, a microwave oven, a washing machine, an air cleaner, a set-top box, a home automation control panel, a security control panel, a TV box (for example, Samsung HomeSync™, Apple TV®, or Goggle TV™), a game console (for example, Xbox™, PlayStation™), an electronic dictionary, an electronic key, a camcorder, or an electronic album.

According to an embodiment of the present disclosure, an electronic device may include at least one of various medical machines (for example, various portable medical measurement devices (a glucose monitor, a heart rate monitor, a blood pressure measuring device, or a thermometer), a magnetic resonance angiography (MRA) device, a magnetic resonance imaging (MRI) device, a computerized tomography (CT) device, a tomograph, an ultrasound machine, and the like), a navigation device, a global positioning system (GPS) receiver, an event data recorder (EDR), a flight data recorder (FDR), an automotive infotainment device, electronic equipment for a ship (for example, a navigation equipment for a ship, a gyro compass, and the like), avionics, a security device, a head unit for vehicles, an industrial or home robot, an automated teller machine (ATM) of a financial institution, a point of sale (POS) device for a store, or the internet of things (IoT) (for example, a lamp, various sensors, an electric or gas meter, a sprinkler, a fire alarm, a thermostat, a streetlamp, a toaster, an exercising machine, a hot water tank, a heater, a boiler, etc.).

According to an embodiment of the present disclosure, an electronic device may include at least one of a part of furniture or a building/a structure, an electronic board, an electronic signature receiving device, a projector, and various measurement devices (for example, devices for measuring water, power, gas, radio waves, and the like). An electronic device according to an embodiment of the present disclosure may be one or a combination of one or more of the above-mentioned devices. In addition, an electronic device according to an embodiment of the present disclosure may be a flexible device. In addition, an electronic device according to an embodiment of the present disclosure is not limited to the above-mentioned devices, and may include an electronic device to be developed.

Hereinafter, an electronic device according to an embodiment of the present disclosure will be described with reference to the accompanying drawings. The term "user" used to describe an embodiment of the present disclosure may refer to a person who uses an electronic device or a device that uses an electronic device (for example, an artificial intelligence electronic device).

FIG. 1 is a block diagram of a network environment 100 including an electronic device 101 according to an embodiment of the present disclosure.

Referring to FIG. 1, the electronic device 101 in the network environment 100 may include a bus 110, a processor 120, a memory 130, an input and output interface 150, a display 160, and a communication interface 170. According to an embodiment of the present disclosure, the electronic device 101 may omit at least one of the elements (for example, the bus 110, the processor 120, the memory 130, the input and output interface 150, the display 160, and the communication interface 170) or may include additional elements.

The bus 110 may include a circuit which connects the elements (for example, the bus 110, the processor 120, the memory 130, the input and output interface 150, the display 160, and the communication interface 170) with one another and transmits communication (for example, a control message and/or data) between the above-described elements (for example, the bus 110, the processor 120, the memory 130, the input and output interface 150, the display 160, and the communication interface 170).

The processor 120 may include one or more of a CPU, an application processor (AP), or a communication processor (CP). The processor 120 may perform a calculation or process data related to control and/or communication of at least one other element.

For example, the processor 120 may configure a proximity network, and exchange data through a communication section synchronized with other electronic devices that belong to a cluster of the proximity network. Furthermore, the processor 120 may perform a further operation in a section other than a synchronized communication section. According to an embodiment of the present disclosure, the processor 120 may adjust a reference value to be used for determining a reference node in a cluster, according to the circumstances of the electronic device 101. For example, the processor 120 may control the electronic device 101 to perform the procedures illustrated in FIGS. 15-17 and 19-22 below.

For example, the electronic device 101 may include a transmitting unit that transmits a reference value for determining a reference node in a cluster including a plurality of electronic devices, and transmits a reference value changed due to an execution of a further operation in a section other than a synchronized communication section in the cluster, and the processor 120 may determine whether or not to operate as the reference node, based on the changed reference value. In this case, the reference node denotes a node that transmits signals for other devices other than the group in a section other than the synchronized communication section.

Moreover, the processor 120 may adjust the reference value before transmitting the changed reference value. For example, if the channel used for the further operation is different from the channel used for the communication in the group, the processor 120 may adjust the reference value. Alternatively, the processor 120 may adjust the reference value, when the electronic device 101 operates as the reference node. Alternatively, the processor 120 may determine the reference value as one of a value less than the current value, a minimum value in the configurable range, a value less than or equal to the average of reference values of one or more other electronic devices in the group, or a value less than or equal to a minimum value of reference values of one or more other electronic devices in the group.

In addition, after the further operation is completed, the processor 120 may restore the changed reference value to its original reference value. In addition, the transmitting unit may transmit the changed reference value when the processor enters a low power or sleep mode or state. In addition, the processor 120 may restore the changed reference value to its original reference value when the processor terminates the sleep mode. Additionally, the transmitting unit may transmit the changed reference value based on the remaining power of a battery of the electronic device 101.

The memory 130 may include a volatile and/or a non-volatile memory. For example, the memory 130 may store instructions or data which are related to at least one other element of the electronic device 101. According to an embodiment of the present disclosure, the memory 130 may store software and/or a program 140. For example, the program 140 may include a kernel 141, middleware 143, an Application Programming Interface (API) 145, and/or an application program (or an application) 147, and the like. At least some of the kernel 141, the middleware 143, and the API 145 may be referred to as an operating system (OS).

For example, the kernel 141 may control or manage system resources (for example, the bus 110, the processor 120, the memory 130, and the like) which are used for performing operations or functions implemented in the other programs (for example, the middleware 143, the API 145, or the application 147). In addition, the kernel 141 may provide an interface for allowing the middleware 143, the API 145, or the application program 147 to access an individual element of the electronic device 101 and control or manage the system resources.

For example, the middleware 143 may serve as an intermediary to allow the API 145 or the application program 147 to communicate with the kernel 141 and exchange data with the kernel 141. In addition, the middleware 143 may perform a control function (for example, scheduling or load balancing) with respect to work requests received from the application program 147, for example, by giving priority to use the system resources of the electronic device 101 (for example, the bus 110, the processor 120, the memory 130, and the like) to at least one application of the application program 147.

For example, the API 145 may be an interface for allowing the application 147 to control a function provided by the kernel 141 or the middleware 143, and, for example, may include at least one interface or function (for example, instructions) for controlling a file, controlling a window, processing an image, or controlling a text.

For example, the input and output interface 150 may serve as an interface for transmitting instructions or data input from a user or another external device to other element(s) of the electronic device 101. In addition, the input and output interface 150 may output instructions or data received from other element(s) of the electronic device 101 to another external device.

For example, the display 160 may include a liquid crystal display (LCD), a light emitting diode (LED) display, an organic light emitting diode (OLED) display, or a microelectromechanical system (MEMS) display, or an electronic paper display. The display 160 may display various contents (for example, a text, an image, a video, an icon, a symbol, etc.) for the user. The display 160 may include a touch screen, and for example, may receive input of a touch using an electronic pen or a part of a user's body, a gesture, approach, or hovering.

For example, the communication interface 170 may establish communication between the electronic device 101 and an external device (for example, a first external electronic device 102, a second external electronic device 104, or a server 106). For example, the communication interface 170 may be connected to a network 162 via wireless communication or wire communication to communicate with the external electronic device 102, 104, or the server 106.

According to an embodiment of the present disclosure, the communication interface 170 may include a plurality of modules that support a plurality of communication standards. In addition, the communication interface 170 may include a protocol stack for the proximity network. The communication interface 170, which performs a function of transmitting and receiving signals, may be referred to as a transmitting unit, a receiving unit, a communication unit, or a transmitting/receiving unit (e.g. a transceiver).

The wireless communication may use, as a cellular communication protocol, at least one of long term evolution (LTE), LTE advanced (LTE-A), code division multiple access (CDMA), wideband CDMA (WCDMA), universal mobile telecommunication system (UMTS), wireless broadband (WiBro), or global system for mobile communications (GSM), etc. A wire communication may include at least one of a universal serial bus (USB), a high-definition multimedia interface (HDMI), a recommended standard 232 (RS-232), or a plain old telephone service (POTS). The network 162 may include a telecommunications network, for example, at least one of a computer network (for example, a LAN or a wide area network (WAN)), an internet, or a telephone network.

Each of the first external electronic device 102 and the second external electronic device 104 may be the same type of electronic device as the electronic device 101 or a different type of device. According to an embodiment of the present disclosure, the server 106 may include one or more servers. According to an embodiment of the present disclosure, all or a part of the operations executed in the electronic device 101 may be executed in another electronic device or in a plurality of other electronic devices 102, 104 or the server 106. According to an embodiment of the present disclosure, when the electronic device 101 should perform a certain function or service automatically or in response to a request, the electronic device 101 may request the electronic devices 102, 104 or the server 106 to perform at least some function related to the certain function or service additionally or instead of executing the function or service by itself. The electronic devices 102, 104 or the server 106 may execute the requested function or additional function, and transmit the result to the electronic device 101. The electronic device 101 may process the received result as is or additionally, and provide the requested function or service. To achieve this, cloud computing, distributed computing, or client-server computing technology may be used, for example.

Figure 2:
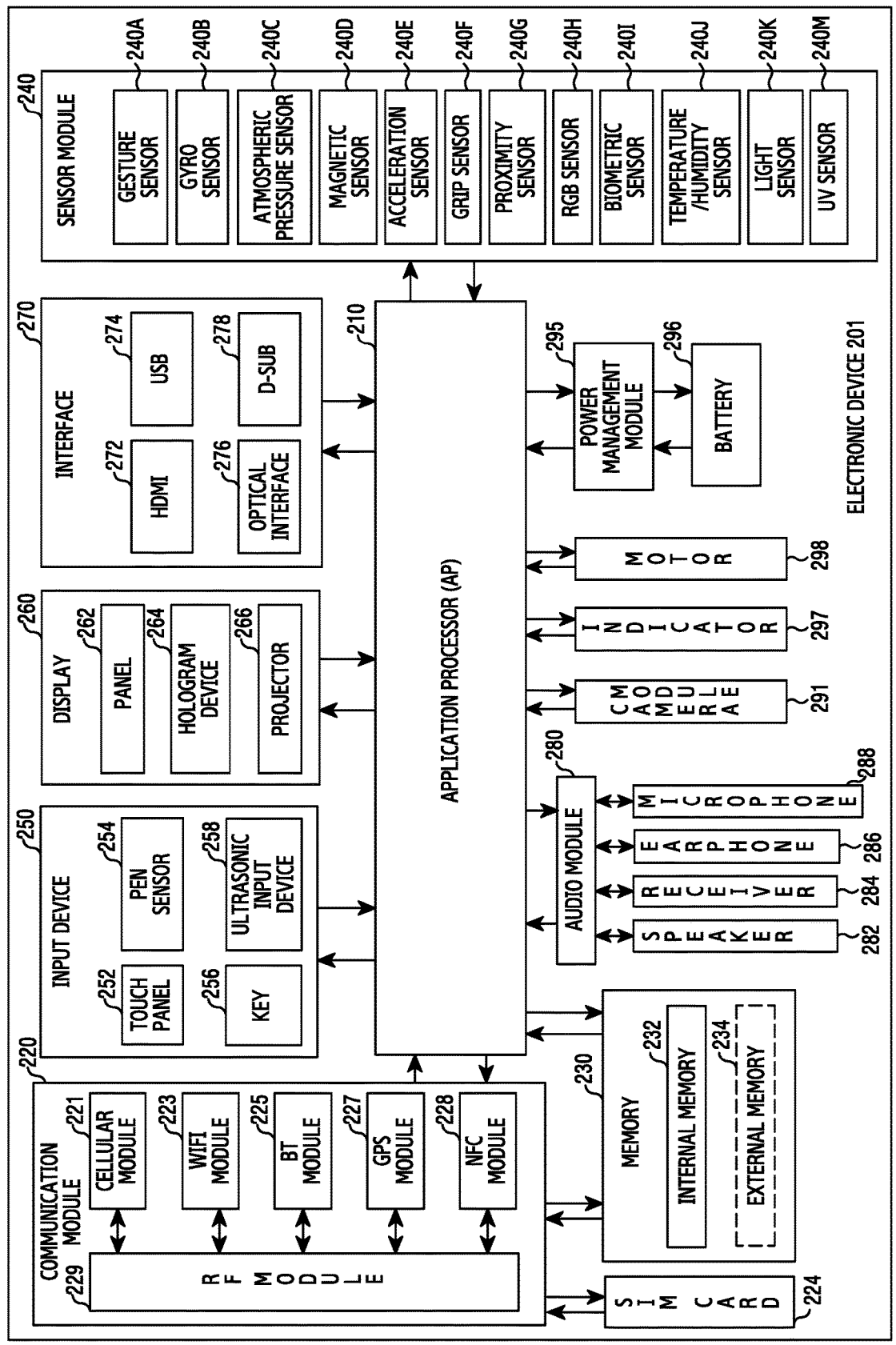
FIG. 2 is a block diagram of an electronic device according to an embodiment of the present disclosure.

FIG. 2 illustrates a block diagram of an electronic device 201 according to an embodiment of the present disclosure.

The electronic device 201 may include all or part of the electronic device 101 shown in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

The AP 210 may control a plurality of hardware or software elements connected to the AP 210 by driving an operating system or an application program, and may process and calculate various data. For example, the AP 210 may be implemented by using a system on chip (SoC). According to an embodiment of the present disclosure, the AP 210 may further include a graphics processing unit (GPU) and/or an image signal processor. The AP 210 may include at least part of the elements shown in FIG. 2 (for example, the cellular module 221). The AP 210 may load instructions or data received from at least one of the other elements (for example, a non-volatile memory) into a volatile memory and process the instructions or data, and may store various data in the non-volatile memory.

The communication module 220 may have the same or a similar configuration as that of the communication interface 160 of FIG. 1. For example, the communication module 220 may include the cellular module 221, a wireless fidelity (WiFi) module 223, a Bluetooth (BT) module 225, a GPS module 227, a near field communication (NFC) module 228, and a radio frequency (RF) module 229.

The cellular module 221 may provide a voice call, a video call, a text service, or an internet service through a telecommunications network. According to an embodiment of the present disclosure, the cellular module 221 may identify and authenticate the electronic device 201 in the telecommunications network by using the SIM card 224. According to an embodiment of the present disclosure, the cellular module 221 may perform at least some of the functions provided by the AP 210. According to an embodiment of the present disclosure, the cellular module 221 may include a communication processor (CP).

The WiFi module 223, the BT module 225, the GPS module 227, and the NFC module 228 may each include a processor for processing data received and transmitted through a corresponding module. According to an embodiment of the present disclosure, at least some (for example, two or more) of the cellular module 221, the WiFi module 223, the BT module 225, the GPS module 227, and the NFC module 228 may be included in a single integrated circuit (IC) or a single IC package.

The RF module 229 may transmit and receive communication signals (for example, an RF signal). For example, the RF module 229 may include a transceiver, a power amplifier module (PAM), a frequency filter, a low noise amplifier (LNA), an antenna, etc. According to an embodiment of the present disclosure, at least one of the cellular module 221, the WiFi module 223, the BT module 225, the GPS module 227, and the NFC module 228 may transmit and receive an RF signal through a single separate RF module.

The SIM card 224 may include a card and/or an embedded SIM including a subscriber identification module, and may include its unique identification information (for example, an integrated circuit card identifier (ICCID)) or subscriber information (for example, international mobile subscriber identity (IMSI)).

The memory 230 (for example, the memory 230) may include an internal memory 232 or an external memory 234. For example, the internal memory 232 may include at least one of a volatile memory (for example, a dynamic random access memory (DRAM), a static RAM (SRAM), a synchronous DRAM (SDRAM), and the like) and a non-volatile memory (for example, a one-time programmable read only memory (OTPROM), a programmable ROM (PROM), an erasable PROM (EPROM), an electrically erasable PROM (EEPROM), a mask ROM, a flash ROM, a flash memory (for example, a NAND flash memory, a NOR flash memory, and the like), a hard drive, and a solid state drive (SSD).

For example, the external memory 234 may further include a flash drive, for example, a compact flash (CF) drive, a secure digital (SD) memory card, a micro SD (Micro-SD) memory card, a mini SD (Mini-SD) memory card, an extreme-digital (xD) memory card, a memory stick, and the like. The external memory 234 may be functionally and/or physically connected with the electronic device 201 through various interfaces.

The sensor module 240 may measure a physical quantity or detect an operational state of the electronic device 201, and may convert measured or detected information into electrical signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240C a color sensor 240H (e.g., a Red, Green, Blue (RGB) sensor), a biometric sensor 240I, a temperature/humidity sensor 240J, a light sensor 240K, and an ultraviolet (UV) light sensor 240M. Additionally or alternatively, the sensor module 240 may include an electronic-nose (E-nose) sensor, an electromyography (EMG) sensor, an electroencephalogram (EEG) sensor, an electrocardiogram (ECG) sensor, an infrared ray (IR) sensor, an iris sensor, and/or a fingerprint sensor, and the like. The sensor module 240 may further include a control circuit to control at least one sensor included therein. According to an embodiment of the present disclosure, the electronic device 201 may further include a processor configured to control the sensor module 240 as a part of the AP 210 or as a separate part, and may control the sensor module 240 while the AP 210 is in a sleep state.

The input device 250 may include a touch panel 252, a (digital) pen sensor 254, a key 256, or an ultrasonic input device 258. The touch panel 252 may recognize a touch input in at least one of capacitive, resistive, infrared, and ultrasonic methods. In addition, the touch panel 252 may further include a control circuit. The touch panel 252 may further include a tactile layer to provide a tactile response to the user.

The (digital) pen sensor 254 may be a part of the touch panel or may include a separate detection sheet. The key 256 may include a physical button, an optical key, or a keypad. The ultrasonic input device 258 allows the electronic device 201 to detect sound waves through a microphone (for example, the microphone 288) through an input device generating ultrasonic signals.

The display 260 (e.g., the display 160 of FIG. 1) may include a panel 262, a hologram device 264, or a projector 266. The panel 262 may have the same or a similar configuration as that of the display 160 of FIG. 1. For example, the panel 262 may be implemented to be flexible, transparent, or wearable. The panel 262 may be configured as a single module along with the touch panel 252. The hologram device 264 may show a stereoscopic image in the air using the interference of light. The projector 266 may display an image by projecting light onto a screen. The screen may be located internally or externally to the electronic device 201. According to an embodiment of the present disclosure, the display 260 may further include a control circuit to control the panel 262, the hologram device 264, or the projector 266.

The interface 270 may include an HDMI 272, a USB 274, an optical interface 276, or a D-subminiature (D-sub) connector 278. The interface 270 may be included in the communication interface 160 shown in FIG. 1. Additionally or alternatively, the interface 270 may include a mobile high-definition link (MHL) interface, a secure digital (SD)/multimedia card (MMC) interface or an Infrared Data Association (IrDA) standard interface.

The audio module 280 may convert a sound to an electrical signal and vice versa. For example, at least some elements of the audio module 280 may be included in the input and output interface 140 shown in FIG. 1. The audio module 280 may process sound information which is input or output through a speaker 282, a receiver 284, an earphone 286, or the microphone 288.

The camera module 291 is a device for photographing a still image and a moving image, and, according to an embodiment of the present disclosure, the camera module 291 may include one or more image sensors (for example, a front surface sensor or a rear surface sensor), a lens, an image signal processor (ISP), or a flash (for example, an LED or a xenon lamp).

The power management module 295 may manage power of the electronic device 201. The power management module 295 may include a power management IC (PMIC), a charging IC, or a battery gauge. For example, the PMIC may include a wire charging method and/or a wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added. For example, the battery gauge may measure a remaining battery life of the battery 296, a voltage, a current, or the temperature during charging. The battery 296 may include a rechargeable battery and/or a solar battery.

The indicator 297 may display a certain state of the electronic device 201 or a part thereof (for example, the AP 210), for example, a booting state, a message state, or a charging state. The motor 298 may convert an electrical signal into a mechanical vibration, and cause a vibration or haptic effect. The electronic device 201 may include a processing device (for example, a GPU) for supporting a mobile TV. A processing device for supporting a mobile TV may process media data according to a standard such as the digital multimedia broadcasting (DMB) standard, the digital video broadcasting (DVB) standard, or the media flow standard.

Each of the above-described elements of the electronic device 201 according to an embodiment of the present disclosure may be comprised of one or more components, and the names of the elements may vary according to the type of the electronic device 201. The electronic device 201 according to an embodiment of the present disclosure may include at least one of the above-described elements, and some of the elements may be omitted or an additional element may be further included. In addition, some of the elements of the electronic device 201 according to an embodiment of the present disclosure may be combined into a single entity, and may perform the same functions as those of the elements before being combined.

Figure 3:
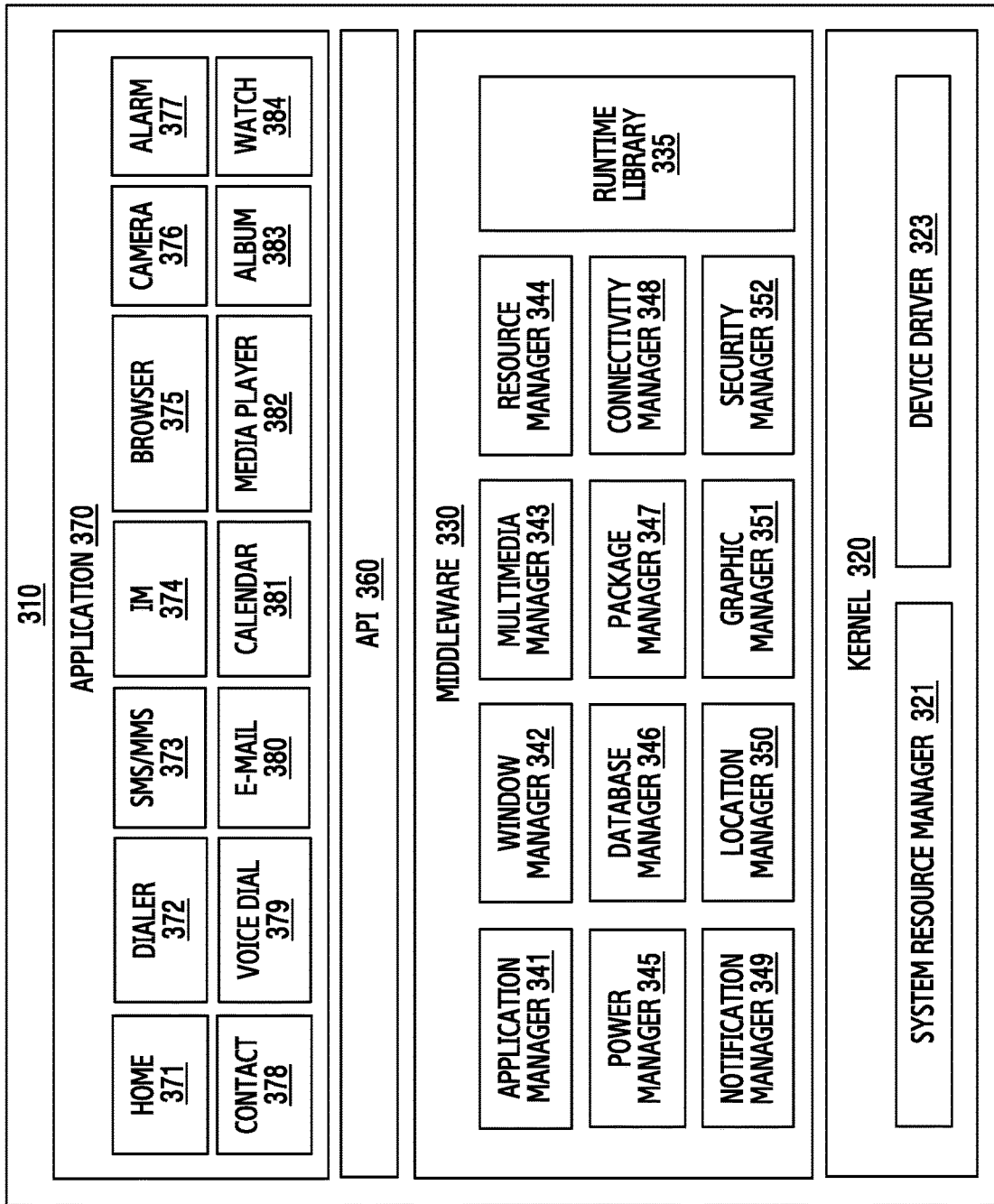
FIG. 3 is a block diagram of a program module according to an embodiment of the present disclosure.

FIG. 3 is a block diagram of a program module 310 according to various exemplary embodiments.

According to an embodiment of the present disclosure, the program module 310 (for example, the program 140 of FIG. 1) may include an OS for controlling resources related to the electronic device 101 and/or various applications (for example, the application 147 in FIG. 1) driven on the OS. For example, the OS may be Android, iOS, Windows®, Symbian, Tizen™, Bada, or the like.

The program module 310 may include a kernel 320, middleware 330, an API 360, and/or an application 370. At least part of the program module 310 may be preloaded on an electronic device or downloaded from the server 106.

The kernel 320 (for example, the kernel 141 of FIG. 1) may include a system resource manager 321 or a device driver 323. The system resource manager 321 may control, allocate or collect system resources. According to an embodiment of the present disclosure, the system resource manager 321 may include a process manager, a memory manager, a file system manager, and the like. The device driver 323 may include a display driver, a camera driver, a Bluetooth driver, a shared memory driver, a USB driver, a keypad driver, a WiFi driver, an audio driver, or an inter-process communication (IPC) driver, for example.

The middleware 330 may provide functions which are commonly required by the application 370 or may provide various functions to the application 370 through the API 360 such that the application 370 can effectively use limited system resources in the electronic device 101. According to an embodiment of the present disclosure, the middleware 330 (for example, the middleware 143 of FIG. 1) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

For example, the runtime library 335 may include a library module which is used by a compiler to add a new function through a programming language while the application 370 is executed. The runtime library 335 may perform functions on input/output management, memory management, an arithmetic function, and the like.

The application manager 341 may manage a life cycle of at least one of the application 370, for example. The window manager 342 may manage a graphical user interface (GUI) resources used in a screen. The multimedia manager 343 recognizes a format necessary for reproducing various media files and encodes or decodes media files using a coder/decoder (codec) suited to the corresponding format. The resource manager 344 may manage resources such as source code, memory, or storage space of at least one of the applications in the application 370.

The power manager 345 operates along with a basic input/output system (BIOS) to manage a battery or power and provide power information necessary for operations of the electronic device 101. The database manager 346 may generate, search, or change a database which is used in at least one of the applications of the application 370. The package manager 347 may manage installing or updating an application which is distributed in the form of a package file.

The connectivity manager 348 may manage a wireless connection of WiFi, Bluetooth, and the like. The notification manager 349 may display or provide notification of an event such as an arrival of a message, an appointment, and a notification of proximity in such a manner that the event does not hinder a user. The location manager 350 may manage location information of the electronic device 101. The graphic manager 350 may manage a graphic effect to be provided to a user or a relevant user interface. The security manager 352 may provide an overall security function necessary for system security or user authentication. According to an embodiment of the present disclosure, when the electronic device 101 is equipped with a telephony function, the middleware 330 may further include a telephony manager to manage a speech or video telephony function of the electronic device 101.

The middleware 330 may include a middleware module to form a combination of the various functions of the above-described elements. The middleware 330 may provide a module which is customized according to a type of OS to provide a distinct function. The middleware 330 may dynamically delete some of the existing elements or may add new elements.

The API 360 (for example, the API 145 of FIG. 1) is a set of API programming functions and may be provided in a different configuration according to an OS. For example, in the case of Android or iOS, a single API set may be provided for each platform. In the case of Tizen™, two or more API sets may be provided.

The application 370 (for example, the application 147 of FIG. 1) may include one or more applications for providing functions, such as a home application 371, a dialer application 372, a short message service (SMS)/multimedia messaging service (MMS) application 373, an instant message (IM) application 374, a browser application 375, a camera application 376, an alarm application 377, a contacts application 378, a voice dial application 379, an email application 380, a calendar application 381, a media player application 382, an album application 383, a clock application 384, a health care application (for example, measuring exercise or a blood sugar level), and an application for providing environmental information (for example, information on atmospheric pressure, humidity, or temperature), for example.

According to an embodiment of the present disclosure, the application 370 may include an application for supporting information exchange between the electronic device 101 and the electronic devices 102, 104 (hereinafter, "information exchange application"). The information exchange application may include a notification relay application for relaying certain information to an external electronic device or a device management application for managing an external electronic device.

For example, the notification relay application may include a function of relaying notification information generated by other applications of the electronic device 101 (for example, the SMS/MMS application 373, the email application 380, the health care application, the environmental information application, and the like) to the electronic device 102, 104. In addition, the notification relay application may receive notification information from an external electronic device and may relay the same to a user. For example, the device management application may manage (for example, install, delete or update) at least one function of the electronic device 104 communicating with the electronic device 101 (for example, turning on/off an external electronic device (or some parts thereof) or adjusting brightness (or resolution) of a display), an application operating in the external electronic device or a service provided by the external electronic device (for example, a calling service or a message service).

According to an embodiment of the present disclosure, the application 370 may include an application (for example, a health care application) which is configured according to the attribute (for example, an attribute of an electronic device indicating a type of electronic device, for example, a mobile medical device) of the external electronic device 102, 104. According to an embodiment of the present disclosure, the application 370 may include an application received from the server 106 or the electronic devices 102, 104. According to an embodiment of the present disclosure, the application 370 may include a preloaded application or a third party application which may be downloaded from a server. The names of the elements of the program module 310 according to an embodiment of the present disclosure may be changed according to a type of OS.

According to an embodiment of the present disclosure, at least part of the program module 310 may be implemented by software, firmware, hardware, or a combination of two or more of them. At least part of the program module 310 may be implemented (for example, executed) by a processor (for example, the AP 210). At least part of the program module 310 may include a module, a program, a routine, sets of instructions, or a process to perform one or more functions, for example.

The term "module" used in an embodiment of the present disclosure refers to a unit including one of hardware, software, firmware, or a combination of two or more of them, for example. For example, the term "module" may be used interchangeably with terms like "unit," "logic," "logical block," "component" or "circuit." The term "module" may refer to a minimum unit of an integrally configured part or a part thereof. The term "module" may refer to a minimum unit that performs one or more functions or a part thereof. The term "module" may refer to one of more functions or a part thereof implemented mechanically or electronically. For example, the term "module" may refer to at least one of an application specific integrated circuit (ASIC), a field programmable gate array (FPGA), and a programmable logic device which perform any operation that is known or will be developed in the future.

A proximity network of the present disclosure is described below.

Figure 4:
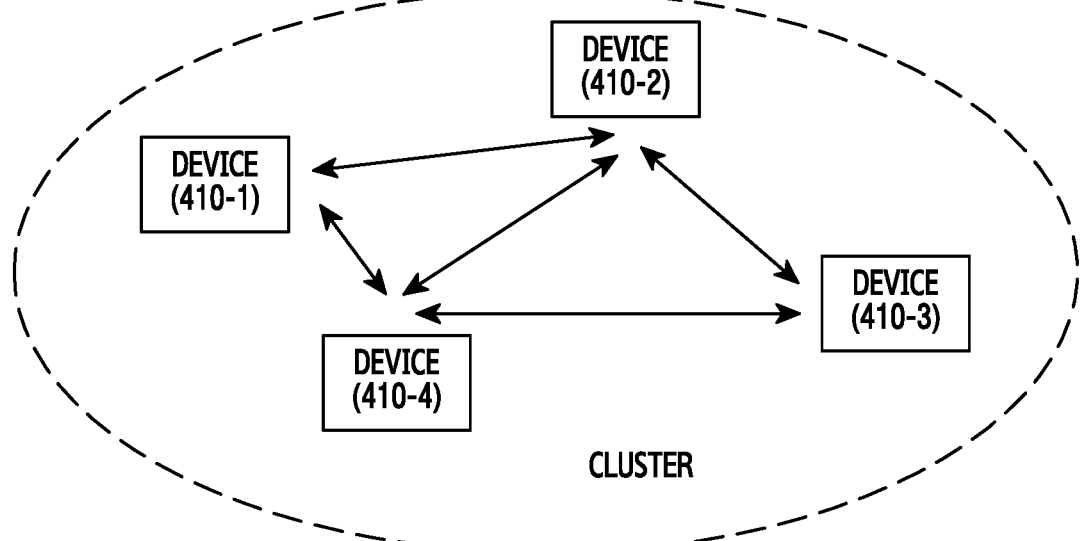
FIG. 4 is a block diagram of a cluster for a proximity network according to an embodiment of the present disclosure.

FIG. 4 is a block diagram of a cluster for a proximity network according to an embodiment of the present disclosure.

The cluster refers to a group of one or more devices constituting the network in order to transmit and receive data between them. The cluster may be referred to as a "neighbor awareness networking (NAN) cluster." Referring to FIG. 4, devices 410-1, 410-2, 410-3, and 410-4 constitute a single cluster. That is, the devices 410-1, 410-2, 410-3, and 410-4 are synchronized with each other, and may exchange data according to a preset protocol. For example, the preset protocol may be the same as the signal transmission protocol illustrated in FIG. 5 below.

Figure 5:
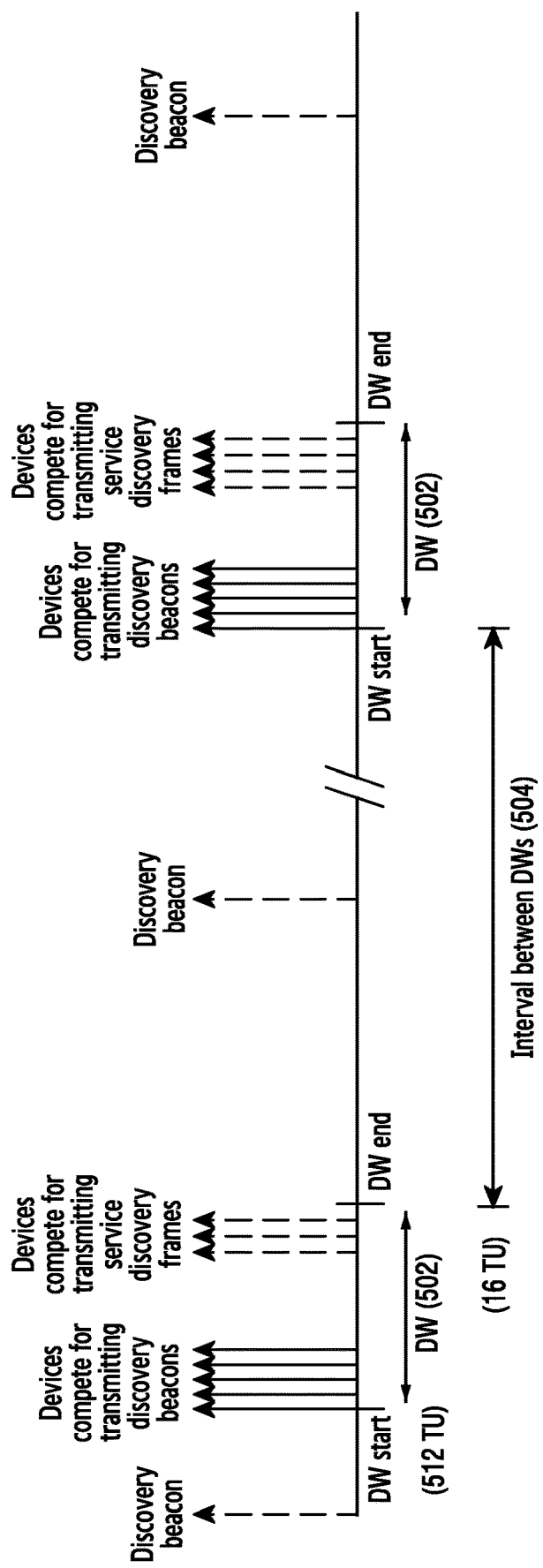
FIG. 5 is a diagram of a signal transmission protocol in a proximity network according to an embodiment of the present disclosure.

FIG. 5 is a diagram of a signal transmission protocol in a proximity network according to an embodiment of the present disclosure.

FIG. 5 shows the signal transmission protocol in a certain channel (e.g., channel 6).

Referring to FIG. 5, a synchronization beacon and a service discovery frame may be transmitted in a synchronized discovery window (DW) section 502 of a cluster, and a discovery beacon may be transmitted in a section 504 other than the DW section 502. In this case, the synchronization beacon and the service discovery frame are transmitted based on contention. DW 502 indicates the section synchronized for the exchange of data between the devices in the cluster. The resource in the channel may be separated in a time unit (TU), and the DWs 502 are spaced from each other by an interval of 512 time units while each DW 502 occupies 16 time units.

A discovery beacon is a signal transmitted in order for other devices, which have in a cluster, to discover the cluster. That is, the discovery beacon is a signal to inform of the existence of a cluster. Accordingly, devices, which have not joined a cluster, may passively scan to detect a discovery beacon and join a cluster. A discovery beacon may include information necessary for synchronizing with a cluster. For example, the discovery beacon may include at least one of a frame control (FC) field for indicating a function of the signal (e.g., a beacon), a broadcast address, a media access control (MAC) address of the transmitting device, a cluster identifier, a sequence control field, a time stamp for the beacon frame, a beacon interval field for indicating the transmission interval of the discovery beacon, or capability information on the transmitting device. For example, the discovery beacon may include at least one proximity network-related information element. The proximity network-related information may be referred to as an "attribute."

The synchronization beacon is a signal for maintaining the synchronization between the synchronized devices in a cluster. The synchronization beacon may include information necessary for synchronizing with a cluster. For example, the synchronization beacon may include at least one of an FC field for indicating a function of the signal (e.g., a beacon), a broadcast address, an MAC address of a transmitting device, a cluster identifier, a sequence control field, a time stamp for the beacon frame, a beacon interval field for indicating the interval between starting points of the DWs 502, or capability information on the transmitting device. For example, the synchronization beacon may include at least one proximity network-related information element.

The service discovery frame is a signal for exchanging data through a proximity network. That is, proximity network-related information may include content for services provided through a proximity network. The service discovery frame, which is a vender specific public action frame, may include various fields. For example, the service discovery frame may include a category, or an action field, and particularly, may include at least one piece of proximity network-related information.

As set forth above, the discovery beacon, the synchronization beacon, and the service discovery frame may include proximity network-related information. Proximity network-related information may include an identifier indicating the type of information, the length of information, and a body field for corresponding information. For example, the corresponding information may include at least one piece of master indication information, cluster information, service identifier list information, service descriptor information, connection capability information, wireless LAN infrastructure information, peer to peer (P2P) operation information, independent basic service set (IBSS) information, mesh information, further proximity network service discovery information, further availability map information, country code information, ranging information, cluster discovery information, vender specifying information, or the like.

Figure 6:
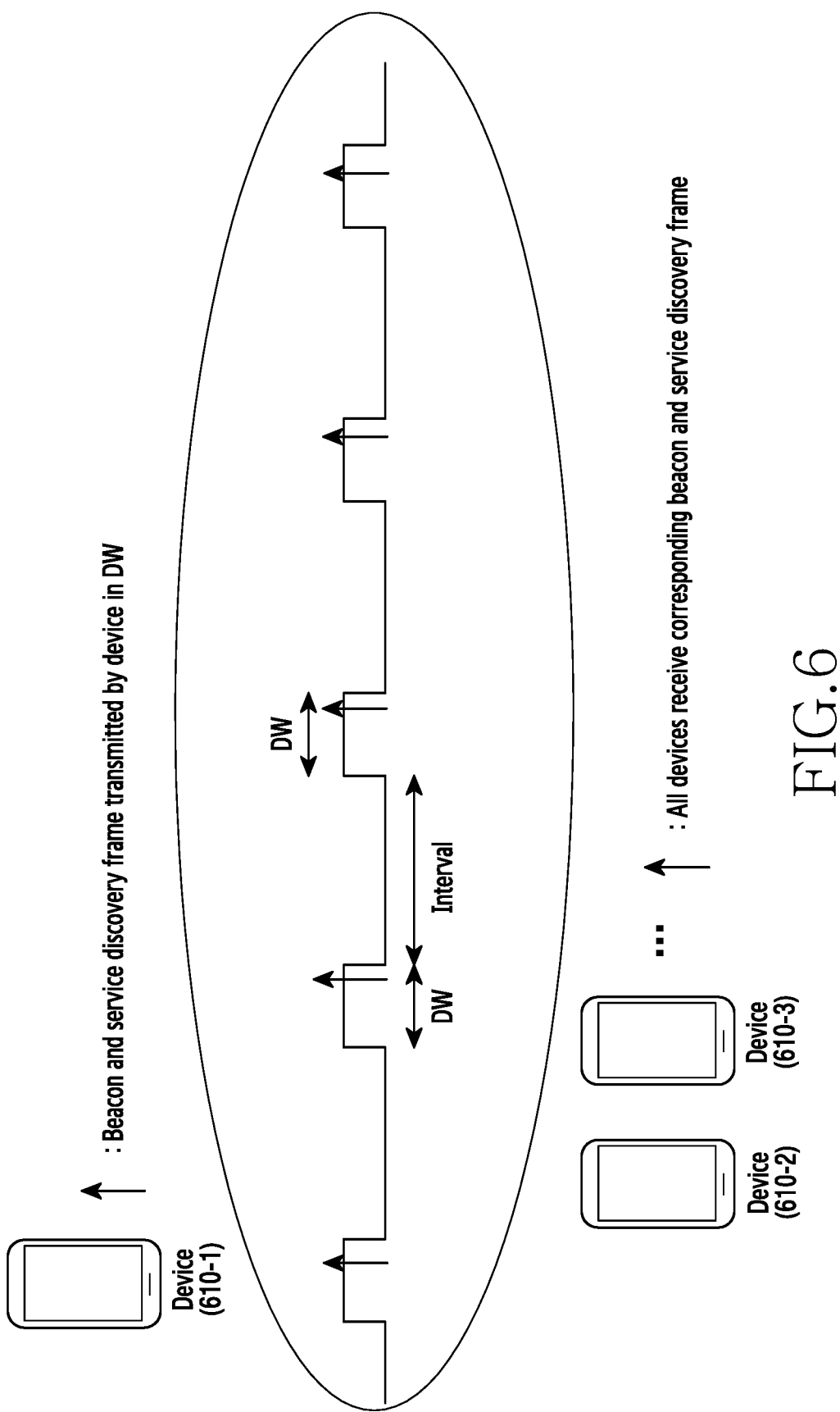
FIG. 6 is a diagram of transmitting and receiving data in a proximity network according to an embodiment of the present disclosure.

FIG. 6 is a diagram of transmitting and receiving data in a proximity network according to an embodiment of the present disclosure. FIG. 6 illustrates that one device transmits and receives data and a beacon, and at least one other device transmits the data and the beacon.

Referring to FIG. 6, a device 610-1 transmits a beacon and a service discovery frame in the DW. Accordingly, devices 610-2 and 610-3 may receive the beacon and the service discovery frame, which are transmitted by the device 610-1. In this case, the beacon transmitted in a DW section is the synchronization beacon, and may include information for maintaining synchronization between the devices 610-1 to 610-3.

In a section other than a DW section, the devices 610-1 to 610-3 are in sleep mode. That is, time clocks of the devices 610-1 to 610-3 are synchronized, and the devices 610-1 to 610-3 may operate in a waking mode while in a DW section. Accordingly, the low power state can be maintained. Accordingly, even though the devices 610-1 to 610-3 maintain the discovery state, the power consumption may be low and it is easy to exchange information. Therefore, various application services may be provided.

In a cluster configured as described above, synchronization and communication may be conducted. In this case, devices, which are able to establish a clock or which form a cluster, may play a role of a master, a synchronized non-master, or a non-synchronized non-master. The master refers to a device that has joined a cluster and transmits a discovery beacon in a section other than in a DW section, and may transmit both a synchronization beacon and a discovery beacon. The synchronized non-master refers to a device that has joined a cluster, but is not the master, and may transmit a synchronization beacon. The non-synchronized non-master refers to a device that has joined a cluster, but has lost synchronization, and does not transmit a synchronization beacon or a discovery beacon. That is, the device playing the role of a master may further perform the function of transmitting a discovery beacon, as compared to other devices that have joined the cluster.

The operation of a device playing the role of a master is described below with reference to FIG. 7. Hereinafter, a device playing the role of a master is referred to as a "master device."

Figure 7:
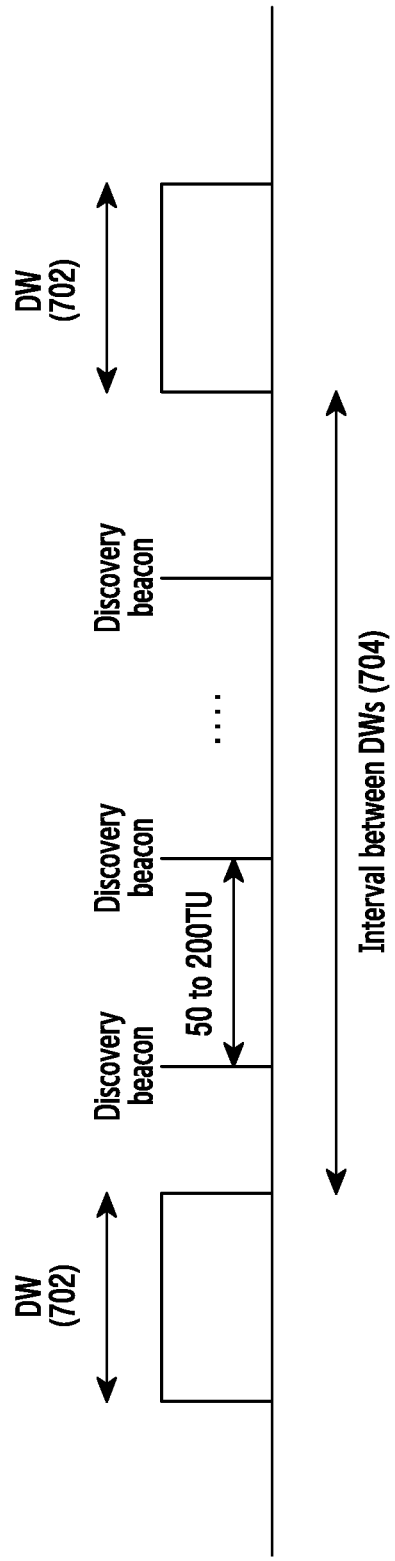
FIG. 7 is a diagram of an operation of a master device in a proximity network according to an embodiment of the present disclosure.

FIG. 7 is a diagram of an operation of a master device in a proximity network according to an embodiment of the present disclosure.

Referring to FIG. 7, the master device may transmit a discovery beacon periodically in the interval 704 between the DWs, i.e., in the section other than in the synchronized DWs 702 sections. For example, the discovery beacons may be transmitted in a period from 50 time units to 200 time units. That is, the master device may transmit the discovery beacons twice (e.g. two periods of 200 time units are possible in the interval 704 of 512 time units between DWs 702) to ten times (e.g. ten periods of 50 time units are possible in the interval 704 of 512 time units between DWs 702). Accordingly, other devices that want to synchronize with the proximity network or cluster of the master device may listen to the channel, i.e., make a passive scan for a predetermined time to thereby receive the discovery beacons, and may synchronize with the cluster of the master device. The devices in the cluster may be synchronized based on a time synchronization function (TSF) of the master device.

As described above, devices may have various roles in a proximity network. In this case, the roles of the devices may be dynamically changed.

Figure 8:
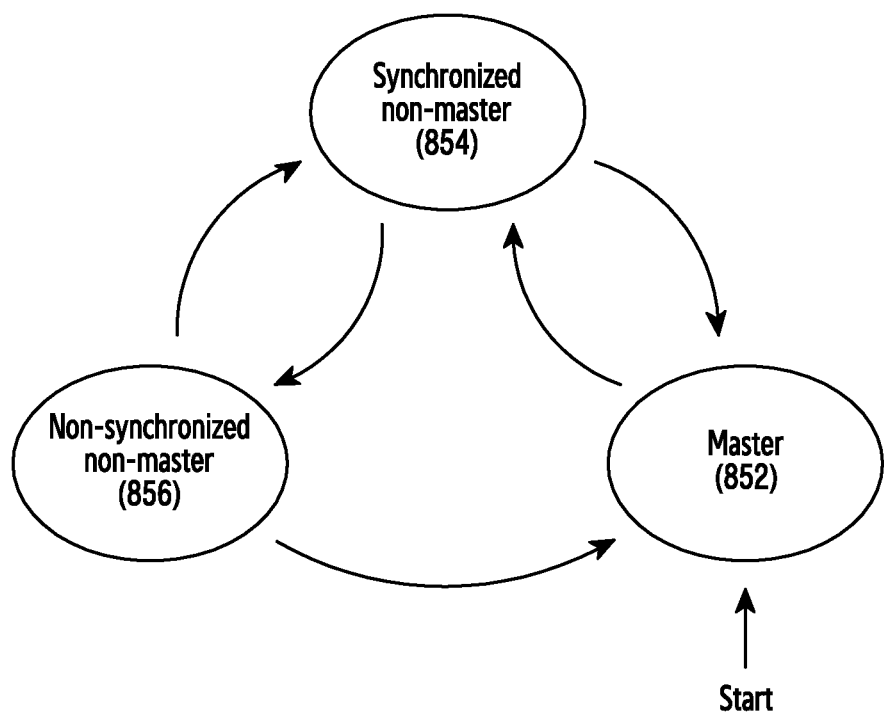
FIG. 8 is a diagram of a transition of a role of a device in a proximity network according to an embodiment of the present disclosure.

FIG. 8 is a diagram of a transition of a role of a device in a proximity network according to an embodiment of the present disclosure.

Referring to FIG. 8, a role or a state of a device may transition from a master 852 to a synchronized non-master 854, or from the synchronized non-master 854 to the master 852. In addition, the role or the state thereof may transition from the synchronized non-master 854 to a non-synchronized non-master 856, or from the non-synchronized non-master 856 to the synchronized non-master 854. Furthermore, the role or the state thereof may transition from the non-synchronized non-master 856 to the master 852.

If an initial cluster is not configured, or if there is only one device in the initial cluster, a device may operate as the master 852. If the initial cluster is not configured, the device may operate as the master 852. Accordingly, the device may broadcast discovery beacons in a certain period (e.g., about 100 ms) in order to support discovery by other devices, and at the same time, the device may make a passive scan in a constant time section (e.g., 110 to 120 ms) in a certain period (e.g., about 10 sec) to detect a discovery signals transmitted by other devices.

The device operating as the master 852 may maintain the role of the master 852 unless it transitions to the synchronized non-master 854 for a single DW. The device operating as the master 852 may transition to the synchronized non-master 854, based on the signal strength (e.g., received signal strength information (RSSI)) of the synchronization beacons received from other devices in the cluster, and information included in the synchronization beacons. Likewise, the device operating as the synchronized non-master 854 may transition to the master 852 at the end of a DW when the transition condition is satisfied. In this case, the device may determine whether or not a role is to transition for a single DW, and may transition at the end of the DW.

In the case where a device transitions from the master 852 to the synchronized non-master 854, the device may maintain a synchronization state before it transitions to the non-synchronized non-master 856. The device operating as the non-synchronized non-master 856 may transition to the master 852 or the synchronized non-master 854 at the end of a DW when the transition condition is satisfied.

As described above, a device synchronized with a cluster may change its role. In this case, it may be determined whether or not the device is to operate as the master, based on the signal strengths of the beacons received from other devices, where the maser ranks the devices. The rank for determining which device should be the master (e.g. the master rank) may be determined based on at least one of master preference, a random factor, or some bits of a device address. A plurality of devices included in a cluster may each determine their own master rank according to a predefined rule, and may determine whether or not they qualify to be the master. In this case, the higher the master rank, the more likely the device qualifies to be the master. For example, the master rank may be determined according to Equation (1) below.

$$MR=MP\times 2^{56}+RF\times 2^{48}+MAC[5]\times 2^{40}+ \ldots +MAC[0] \quad (1)$$

In Equation (1), MR, MP, and RF denote the master rank, the master preference, and the random factor, respectively, and MAC[k] denotes the k-th octet of the device address.

The master preference and the random factor are configured as values between a predefined minimum value (e.g., 0) and a predefined maximum value (e.g., 128). The master preference and the random factor may be determined by each device. The rule to determine the master preference may vary according to an embodiment of the present disclosure. For example, a device may determine its master preference, based on its remaining battery power. The master preference and the random factor may be included in the synchronization beacon or the discovery beacon to be thereby exchanged between the devices. For example, the master preference and the random factor may be included in master indication information, which is one of the proximity network-related information factors. The master indication information may be referred to as a "master indication attribute."

A device address may include an interface address. The interface address is a unique address by which the devices are identified in a cluster. The interface address may be determined based on a MAC address.

As described above, in addition to the exchange of data in the synchronized DW, the devices may perform a further operation in a section other than the DW. That is, at least one of the devices in the cluster may conduct a further operation in a section other than the synchronized communication section. In other words, the device may designate an active time section in a section other than the DW, and may perform a further service discovery operation in the section. In this case, a section other than the DW may be referred to as a "further window," or a "post window." Furthermore, the device may perform the operation, such as a WiFi-Direct connection, the tunneled direct link setup (TDLS), a mesh, the IBSS, or the wireless LAN, as well as the operation of further service discovery. In addition, a device may perform discovery of, and a connection with, a legacy wireless LAN in the further window. A further operation in a section other than the synchronized communication section may be referred to as a "post operation."

In performing a post operation, a device may designate an active time section for the post operation in a section other than a synchronized communication section, and may provide information indicating the active time section. The information indicating the active time section may be transmitted through the service discovery frame in the DW. For example, the information indicating the active time section may be transmitted through further availability map information. The further availability map information may be referred to as a "further availability map attribute." In addition, the device may further provide information on the use of the active time section. The information on the use of the active time section may be transmitted through the service discovery frame in the synchronized section, i.e., the DW. For example, the information on the use may be included in the information factor according to the use. For example, the information factor may include at least one of wireless LAN infrastructure information, P2P operation information, IBSS information, mesh information, or further proximity network service discovery information. Hereinafter, for convenience of explanation, the "information indicating the active time section," and the "information on the use of the active time section" may be called "scheduling information," including both of them.

Figure 9:
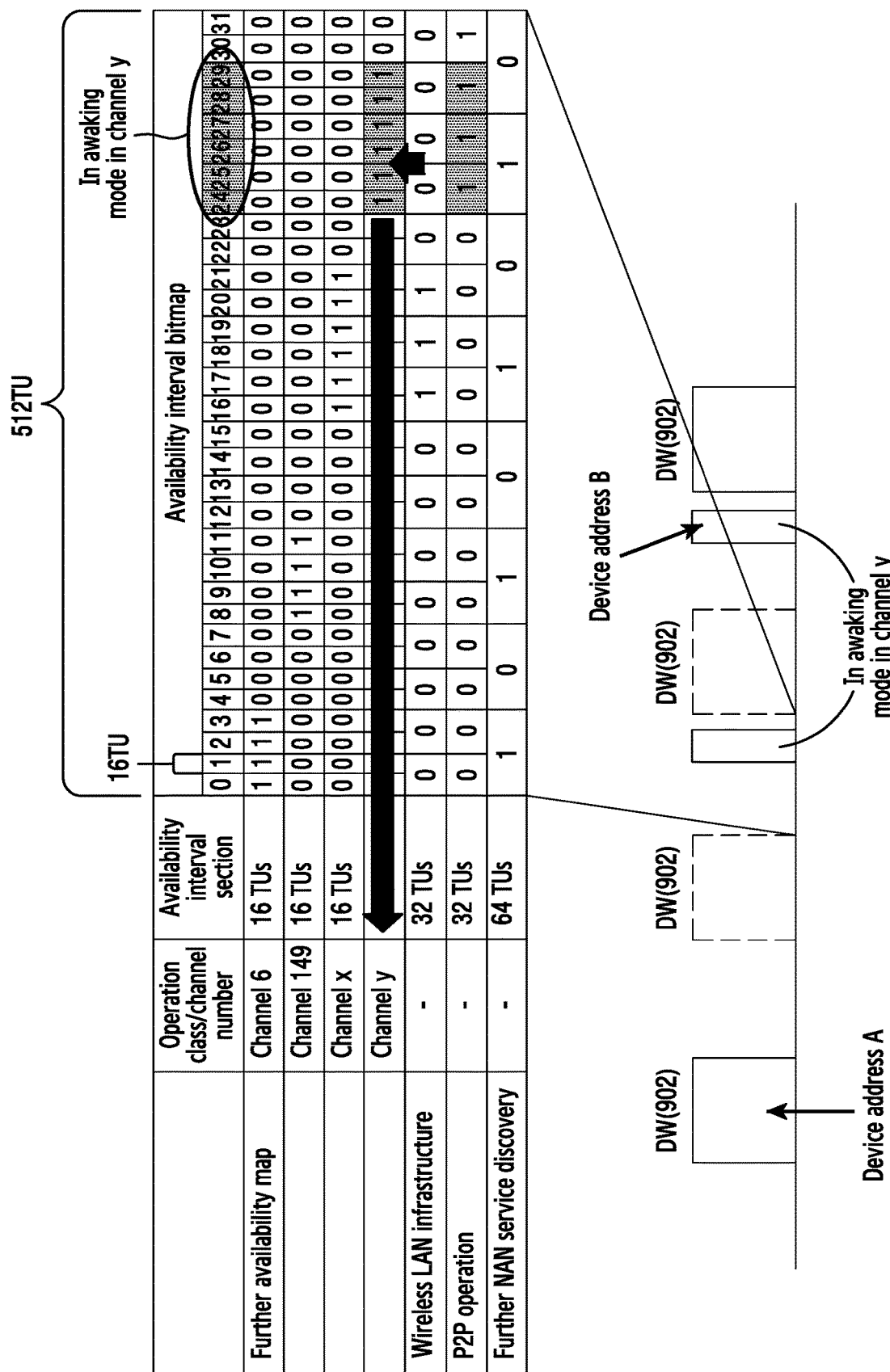
FIG. 9 is a diagram of scheduling information on a post operation in a section other than a synchronized communication section in a proximity network according to an embodiment of the present disclosure.

An example of the configuration of the scheduling information is shown in FIG. 9.

FIG. 9 is a diagram of scheduling information on a post operation in a section other than a synchronized communication section in a proximity network according to an embodiment of the present disclosure. FIG. 9 illustrates the case where a P2P operation, a wireless LAN connection, and a further proximity network service discovery are designated.

Referring to FIG. 9, the scheduling information includes a list of operation classes/channel number, and indicates the number of time units (e.g., 16) of the resource unit in each channel. The availability interval bitmap included in the scheduling information indicates the section in which the operation is performed in each channel, i.e., the active time section. In the embodiment of the present disclosure illustrated in FIG. 9, the active time section is expressed as "1." For example, the availability interval bitmap indicates channel 6 used for the intervals 0 to 3, channel 149 used for the intervals 8 to 11, channel "x" used for the intervals 16 to 21, and channel "y" used for the intervals 24 to 29. In this case, each channel is used for the wireless LAN connection, the P2P operation, and the further proximity network service discovery. In the embodiment of the present disclosure illustrated in FIG. 9, the availability interval bitmap indicates that the wireless LAN connection is performed for the intervals 16 to 21, that the P2P operation is performed for the intervals 24 to 29, and that the further proximity network service discovery is performed for the intervals 0 to 3, 8 to 11, 16 to 19, and 24 to 27.

The lower portion of FIG. 9 illustrates the P2P operation section and the DW section 902. Referring to the lower section of FIG. 9, the device uses the device address A in the DW section 902. In addition, the device may use the device address B in the section other than the DW section 902. That is, the device may use the device address B for the post operation in the section other than the synchronized communication section. In this case, according to the indication of the scheduling information, the device may operate in a waking mode for the P2P operation in the channel "y" in the section corresponding to the intervals 24 to 29 among the section other than the DW section 902.

The embodiment of the present disclosure illustrated in FIG. 9 indicates that a single further availability map is transmitted. However, according to an embodiment of the present disclosure, a plurality of further availability maps may be transmitted. In this case, the plurality of maps may be identified by different identification information.

The information on the section for the post operation, i.e., the attribute, may designate the device address to be used in the section. In this case, the address to be used in the section for the post operation may be different from the device address to be used for the communication operation with respect to the cluster. That is, the device address for the communication in the synchronized cluster, and the device address used for the post operation may be different from each other. In general, the format of the device address follows that of a MAC address.

Figure 10:
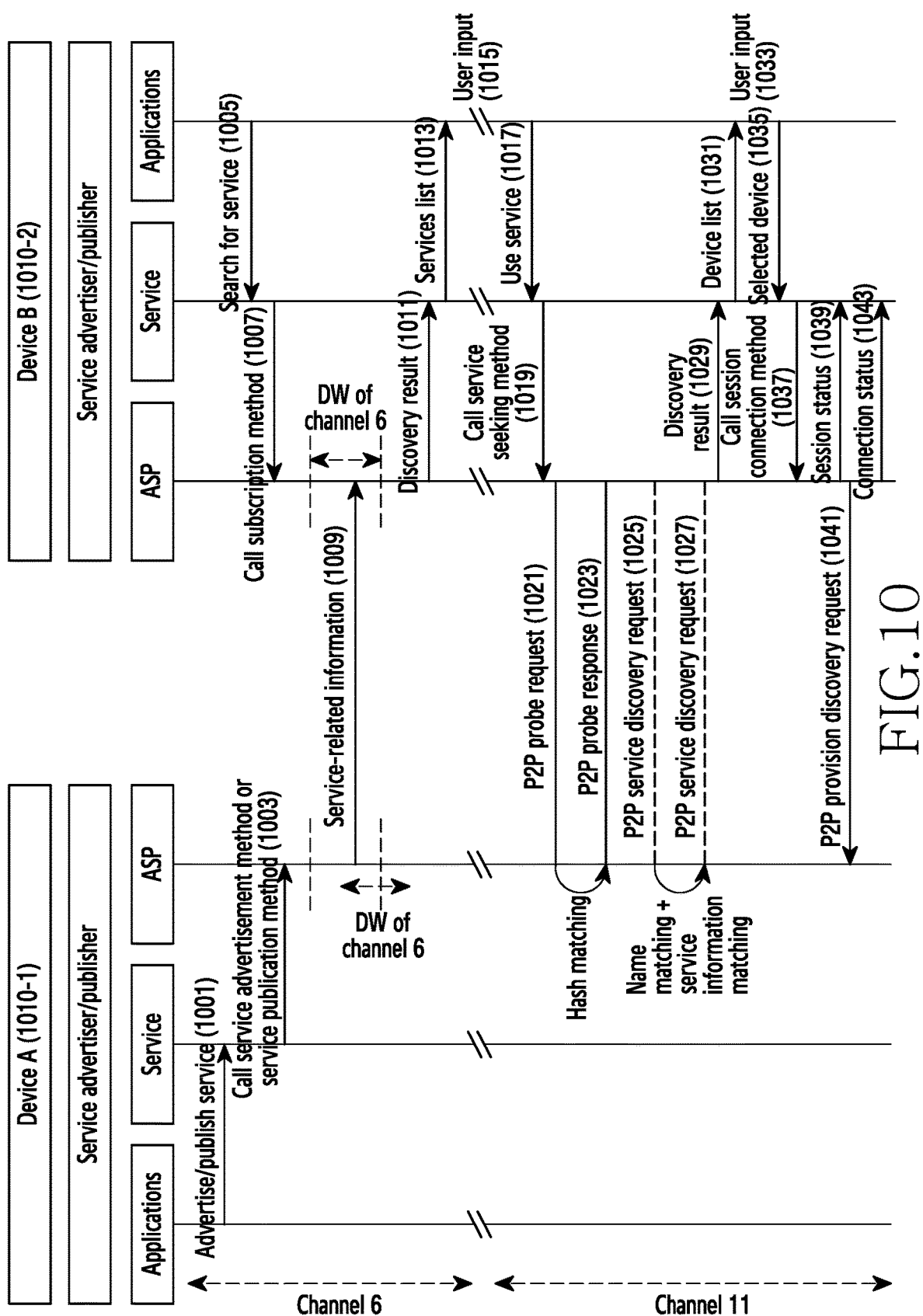
FIG. 10 is a flow diagram of a post operation in a section other than a communication section in a proximity network according to an embodiment of the present disclosure.

FIG. 10 is a flow diagram of a post operation in a section other than a communication section in the proximity network according to an embodiment of the present disclosure. FIG. 10 illustrates that a P2P operation is performed between a device A 1010-1 and a device B 1010-2 in a section other than a synchronized communication section, wherein the proximity network communication is conducted in channel 6, and the P2P operation is conducted in channel 11. That is, FIG. 10 illustrates that the P2P operation is performed in the post window by utilizing channels, windows, and method information, which are published in the synchronized DW.

Referring to FIG. 10, in step 1001, an application entity of the device A 1010-1 makes a request to a service entity of the device A 1010-1 for advertising/publishing services. In step 1003, the service entity of the device A 1010-1 may call a service-advertisement method or a service-publication method from an application service platform (ASP) entity of the device A 1010-1. In this case, in step 1005, an application entity of the device B 1010-2 makes a request to the service entity of the device B 1010-2 for finding services. In step 1007, the service entity of the device B 1010-2 may call a subscription method from an ASP entity of the device B 1010-2.

In step 1009, the ASP entity of the device A 1010-1 transmits service-related information through channel 6 in which the proximity network communication is performed. In this case, the service-related information may include information on the P2P operation, such as, for example, a service identifier, proximity network connection capability (e.g., WiFi Direct service (WFDS)=1), or P2P operation information (e.g., the P2P device, the channel number, the availability interval bitmap, or the like). Accordingly, the ASP entity of the device B 1010-2 receives the service-related information through the channel 6. Next, in step 1011, the ASP entity of the device B 1010-2 provides the discovery result to the service entity of the device B 1010-2.

In step 1013, the service entity of the device B 1010-2 provides a list of services to the application entity of the device B 1010-2. Then, in step 1015, a user's input for selecting a service is received.

In step 1017, the application entity of the device B 1010-2 informs the service entity of the device B 1010-2 of the use of the service. In step 1019, the service entity of the device B 1010-2 calls a service seeking method from the ASP entity of the device B 1010-2.

In step 1021, the ASP entity of the device B 1010-2 transmits a P2P probe request. In this case, the P2P probe request may include a service hash. In step 1023, the ASP entity of the device A 1010-1 checks the hash matching, and transmits a P2P probe response. In this case, the P2P probe response may include a service name, or an advertisement identifier. In step 1025, the ASP entity of the device B 1010-2 transmits a P2P service discovery request. In this case, the P2P service discovery request may include a service name, and a service information request. In step 1027, the ASP entity of the device A 1010-1 checks the name matching and the service information matching, and transmits a P2P service discovery request. In this case, the P2P service discovery request may include a service name, an advertisement identifier, the service status, or the like.

In step 1029, the ASP entity of the device B 1010-2 provides the search result to the service entity of the device B 1010-2. In step 1031, the service entity of the device B 1010-2 provides a list of devices to the application entity of the device B 1010-2. The list of devices may include information on the device A 1010-1. Then, in step 1033, a user's input for selecting the device is received.

In step 1035, the application entity of the device B 1010-2 informs the service entity of the device B 1010-2 of the selected device. In step 1037, the service entity of the device B 1010-2 calls a service connection method from the ASP entity of the device B 1010-2. In step 1039, the ASP entity of the device B 1010-2 informs the service entity of the device B 1010-2 of the session status. In this case, the session status may be the "initiated status." In step 1041, the ASP entity of the device B 1010-2 transmits a P2P provision discovery request. In this case, the P2P provision discovery request may include session information, connection capability, or the like. Then, in step 1043, the ASP entity of the device B 1010-2 informs the service entity of the device B 1010-2 of the connection status. In this case, the connection status may be the status of "service request sent."

As described above, in configuring the proximity network, other operations may be performed in the section other than the synchronized communication section (e.g., the DW) in the cluster of the proximity network. However, the device operating as a master should transmit the discovery beacons in the section other than the synchronized communication section, as shown in FIG. 11.

Figure 11:
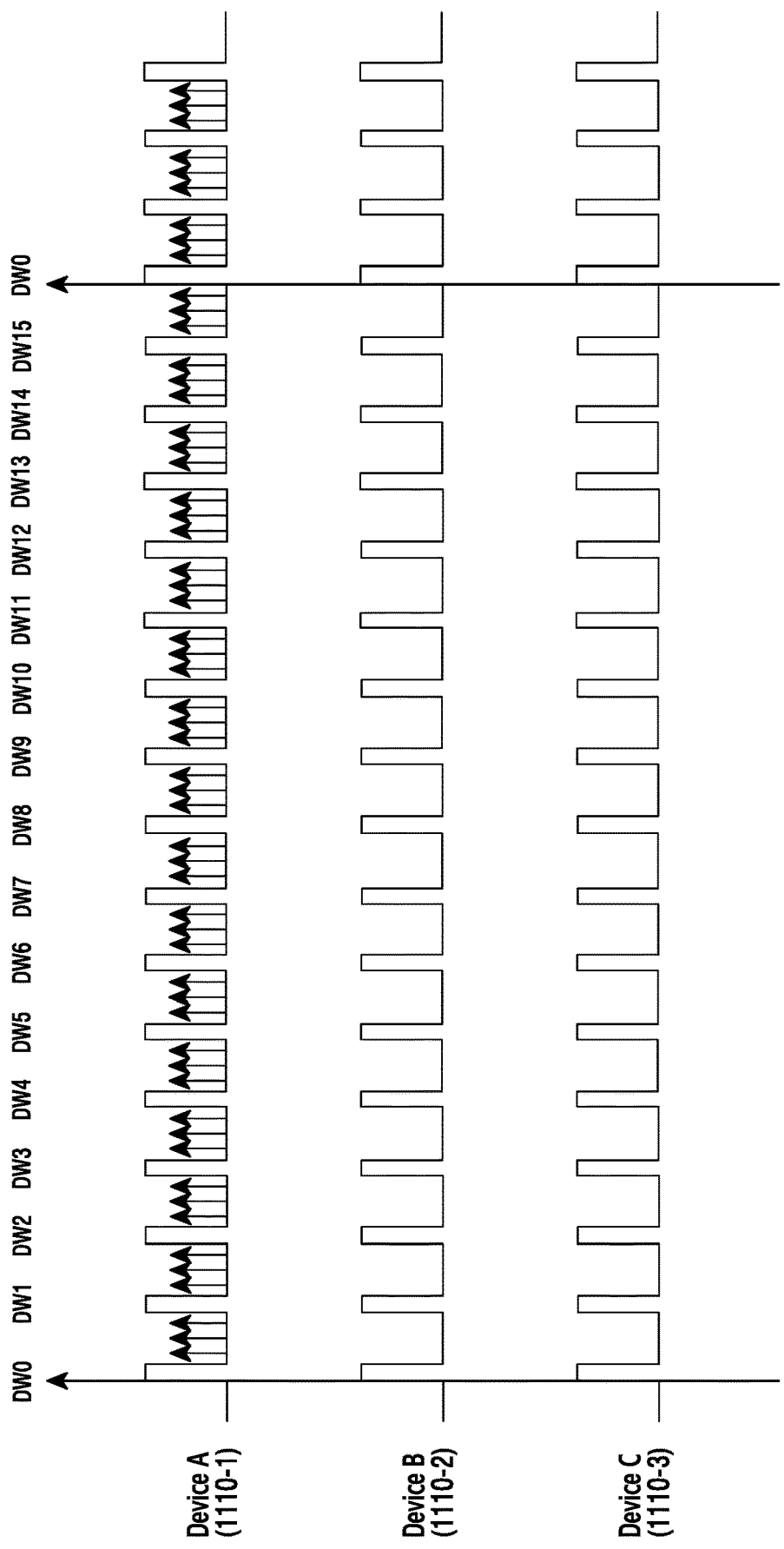
FIG. 11 is a diagram of a beacon transmission of a master device in a proximity network according to an embodiment of the present disclosure.

FIG. 11 is a diagram of a beacon transmission of a master device in a proximity network according to an embodiment of the present disclosure.

Referring to FIG. 11, a device A 1110-1 operates as a master, and a device B 1110-2 and a device C 1110-3 operate as non-masters. The device A 1110-1, which operates as the master, communicates with the device B 1110-2 and the device C 1110-3 in the DW section, and periodically transmits the discovery beacons for informing of the presence of the cluster in the section other than the DW. Accordingly, the power consumption of the device A 1110-1 is more than that of the device B 1110-2 or the device C 1110-3. Furthermore, the device A 1110-1, due to the transmission of the discovery beacon, may be restricted to performing the post operation through the same channel or a different channel. Therefore, hereinafter, an embodiment of the present disclosure provides attenuates the restriction caused by the operation of the master.

As described above, the role of the master is determined based on the signal strength and the master rank with respect to the other devices. In addition, the master rank may be determined based on the master preference, the random factor, and the device address. In this case, according to Equation (1), the master preference is the biggest influence to the determination of the master rank. Hereinafter, an embodiment of the present disclosure avoids being selected as the master, by properly adjusting the master preference.

Figure 12:
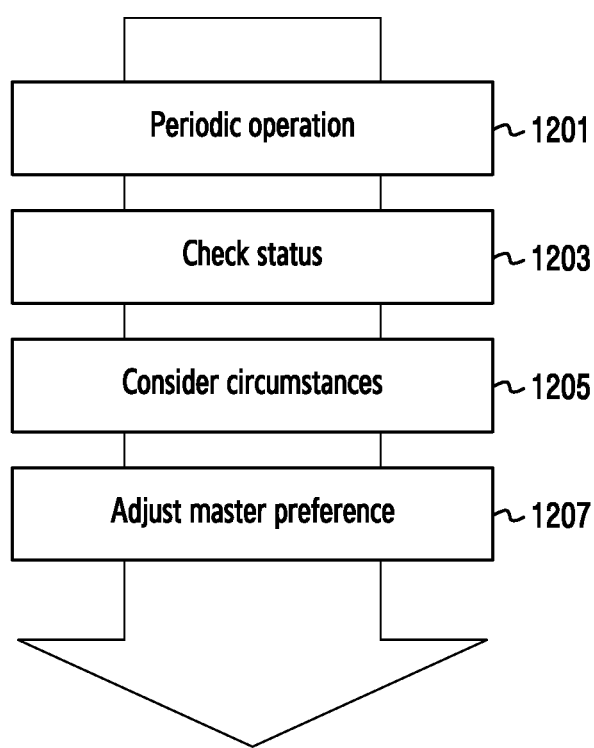
FIG. 12 is a flowchart of a method of determining a master preference in an electronic device according to an embodiment of the present disclosure.

FIG. 12 is a flowchart of a method of determining a master preference in an electronic device according to an embodiment of the present disclosure.

Referring to FIG. 12, in step 1201, the electronic device conducts a periodic operation. That is, the electronic device conducts at least one operation to configure a cluster. For example, the electronic device broadcasts signals (e.g., discovery beacons) for supporting the discovery of other electronic devices according to a certain period (e.g., 100 ms). In addition, the electronic device may scan in the section of a constant time length (e.g., 110 to 120 ms) every certain periods (e.g., about 10 seconds) to receive signals (e.g., discovery beacons) broadcast by the other electronic devices. If at least one of the other electronic devices is detected, the cluster may be configured. The electronic device may exchange synchronization beacons and service data frames with the other electronic devices in the cluster through the DW. The device operating as the master may transmit the discovery beacons in the DW interval section, and the remaining devices except for the non-synchronized non-master may transmit the synchronization beacons in the DW.

In this case, the synchronization beacon and the discovery beacon include the master indication information, and the master indication information includes the master preference of the device that transmits the corresponding signal. The master preference is a variable to be used in determining the master in the cluster. Accordingly, each of the devices in the cluster may identify the master preference of the other devices as well as its own master preference. That is, the electronic device may perform the periodic operation according to a predetermined protocol for the communication in the cluster, and at the same time, may store master preference values of one or more of the other devices, which are included in one or more signals (e.g., the synchronization beacons) received from the other devices through the DW.

In step 1203, the electronic device identifies a status. In this case, the status refers to a role that the electronic device plays in the cluster. For example, the status may be defined as one of the master, the synchronized non-master, or the non-synchronized non-master. The status may be dynamically changed periodically. For example, the status may transition as shown in FIG. 8. Therefore, the electronic device checks whether the current status is the master, the synchronized non-master, or the non-synchronized non-master.

In step 1205, the electronic device considers circumstances. The circumstances may be changed in various ways according to an embodiment of the present disclosure. For example, the circumstances may include at least one of performing a post operation in a section other than the synchronized communication section, or an operation mode (e.g., a sleep mode, or a waking mode) of the processor (e.g., the AP) of the electronic device.

In step 1207, the electronic device adjusts the master preference. The master preference may be adjusted such that the electronic device is not likely to be selected as the master. The master preference may be adjusted according to a predefined rule. The predefined rule may be defined to adjust the master preference, based on the configurable range of the master preference, or master preference values of other devices. For example, the electronic device may reduce the master preference to a value less than the current value in the predefined range (e.g., 0 to 128). For example, the master preference may be adjusted to a minimum value in the configurable range. That is, the master preference may be adjusted to zero, and in this case, other electronic devices may have lesser master preference values. As another example, the electronic device may adjust the master preference, based on the master preference values of other electronic devices, which are obtained through the periodic operation. For example, the electronic device may adjust the master preference to be less than an average of master preference values of other electronic devices. Alternatively, the electronic device may adjust the master preference to be less than a minimum master preference value of other electronic devices. In this case, a difference between the average value or the minimum value and the adjusted value may be determined according to a predefined rule.

Figure 13:
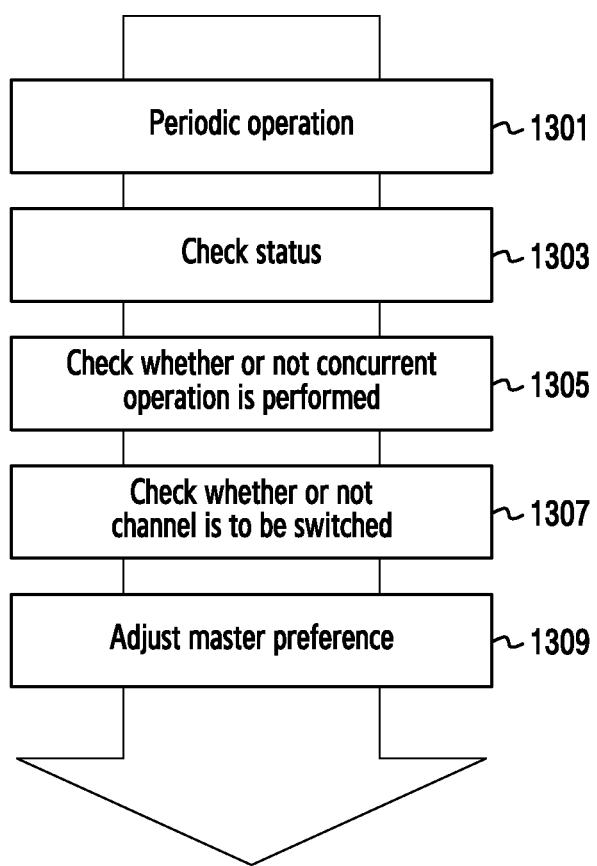
FIG. 13 is a flowchart of a method of determining a master preference according to an execution of a concurrent operation in an electronic device according to an embodiment of the present disclosure.

FIG. 13 is a flowchart of a method of determining a master preference according to an execution of a concurrent operation in an electronic device according to an embodiment of the present disclosure. The concurrent operation indicates a case where a post operation is performed in a section other than a synchronized communication section.

Referring to FIG. 13, in step 1301, the electronic device performs a periodic operation. That is, the electronic device performs at least one operation to configure a cluster. For example, the electronic device broadcasts signals (e.g., discovery beacons) for supporting the discovery of other electronic devices according to a certain period (e.g., 100 ms). In addition, the electronic device may scan in a section of a constant time length (e.g., 110 to 130 ms) every certain period (e.g., about 10 seconds) to receive signals (e.g., discovery beacon) broadcast by other electronic devices. If at least one of the other electronic devices is detected, the cluster may be configured. The electronic device may exchange synchronization beacons and a service data frame with the other electronic devices in the cluster through a DW. The device operating as the master may transmit the discovery beacons in the DW interval section, and the remaining devices except for the non-synchronized non-master may transmit the synchronization beacons in the DW.

In this case, the synchronization beacon and the discovery beacon include the master indication information, and the master indication information includes the master preference of the device that transmits the corresponding signal. The master preference is a variable to be used in determining the master in the cluster. Accordingly, each of the electronic devices in the cluster may identify the master preference of other electronic devices as well as its own master preference. That is, the electronic device may perform the periodic operation according to a predetermined protocol for the communication in the cluster, and at the same time, may store master preference values of one or more of the other devices, which are included in one or more signals (e.g., the synchronization beacon) received from the other devices through the DW.

In step 1303, the electronic device identifies the status. In this case, the status refers to the role that the electronic device plays in the cluster. For example, the status may be defined as one of the master, the synchronized non-master, or the non-synchronized non-master. The status may be dynamically changed periodically. For example, the status may transition as shown in FIG. 8. Thus, the electronic device checks whether the current status is the master, the synchronized non-master, or the non-synchronized non-master.

In step 1305, the electronic device checks whether or not a concurrent operation is performed. The concurrent operation refers to a post operation in the synchronized communication section, i.e., in the section other than the DW. The execution of the concurrent operation may be determined according to the execution of the post operation, or the execution of the communication operation using an address different from the device address used in the cluster. In a case in which the concurrent operation is executed, the signal (e.g., the synchronization beacon, or the service discovery frame) transmitted by the electronic device may include the scheduling information on the concurrent operation. For example, the scheduling information may include further availability map information, and information indicating the section in which the corresponding operation is executed.

In step 1307, the electronic device checks whether or not channel switching is required. The concurrent operation may be executed in the channel identical to or different from the channel used in the communication for the cluster. That is, when the concurrent operation is performed in a channel different from the channel used in the communication for the cluster, the electronic device changes the channel for the concurrent operation. In this case, the electronic device tunes the operating frequency of the hardware for the communication. In this case, if the electronic device operates as the master, since the electronic device transmits the discovery beacon in the section other than the synchronized communication section, interference may occur in the transmission of the discovery beacon due to the switching of the channel. That is, the channel switching in the section other than the synchronized communication section may cause interference to thereby lower the operation efficiency. However, according to an embodiment of the present disclosure, step 1307 may be omitted.

In step 1309, the electronic device adjusts the master preference. The master preference may be adjusted such that the device is not likely to be selected as the master. The master preference may be adjusted according to a predefined rule. The predefined rule may be defined to adjust the master preference, based on the configurable range of the master preference, or the master preference values of other devices. For example, the electronic device may reduce the master preference to a value less than the current value in the predefined range (e.g., 0 to 128). For example, the master preference may be adjusted to a minimum value in the configurable range. That is, the master preference may be adjusted to zero, and in this case, other electronic devices may have lesser master preference values. As another example, the electronic device may adjust the master preference, based on the master preference values of the other electronic devices, which are obtained through the periodic operation. For example, the electronic device may adjust the master preference to be less than an average of master preference values of the other electronic devices. Alternatively, the electronic device may adjust the master preference to be less than a minimum master preference value of the other electronic devices. In this case, a difference between the average value or the minimum value and the adjusted value may be determined according to a predefined rule.

Figure 14:
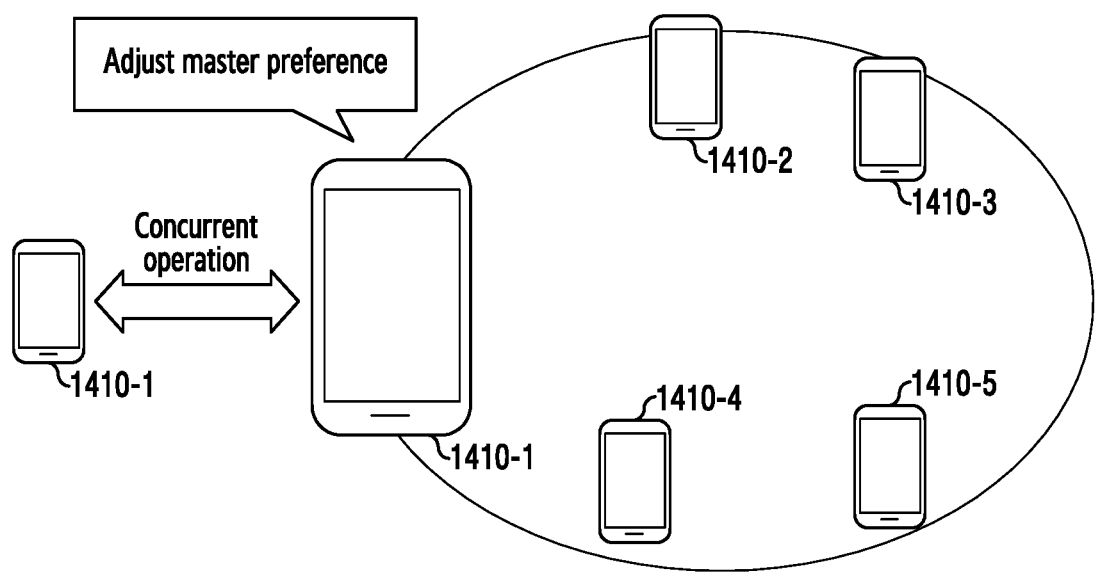
FIG. 14 is a diagram of adjusting a master preference depending on a concurrent operation in an electronic device according to an embodiment of the present disclosure.

FIG. 14 is a diagram in which a master preference is adjusted depending on a concurrent operation in an electronic device according to an embodiment of the present disclosure.

Referring to FIG. 14, devices 1410-1 to 1410-5 are in a cluster, and transmit beacons and data through a synchronized communication section (e.g., a DW). In this case, the device 1410-1 performs a concurrent operation. That is, the device 1410-1 performs a communication in the cluster in the synchronized communication section, and performs a post operation in a section other than the synchronized communication section. The post operation may include at least one of connecting with WiFi-Direct, a TDLS, a mesh, an IBSS, or a wireless LAN, or discovering another cluster.

Accordingly, the device 1410-1 may adjust its master preference. That is, if the concurrent operation is performed, the device 1410-1 may avoid being selected as the master by lowering its master preference. For example, the device 1410-1 may adjust its master preference to a minimum value in a configurable range, or to a value less than an average value or a minimum value of the master preference values of the other devices 1410-2 to 1410-5.

Figure 15:
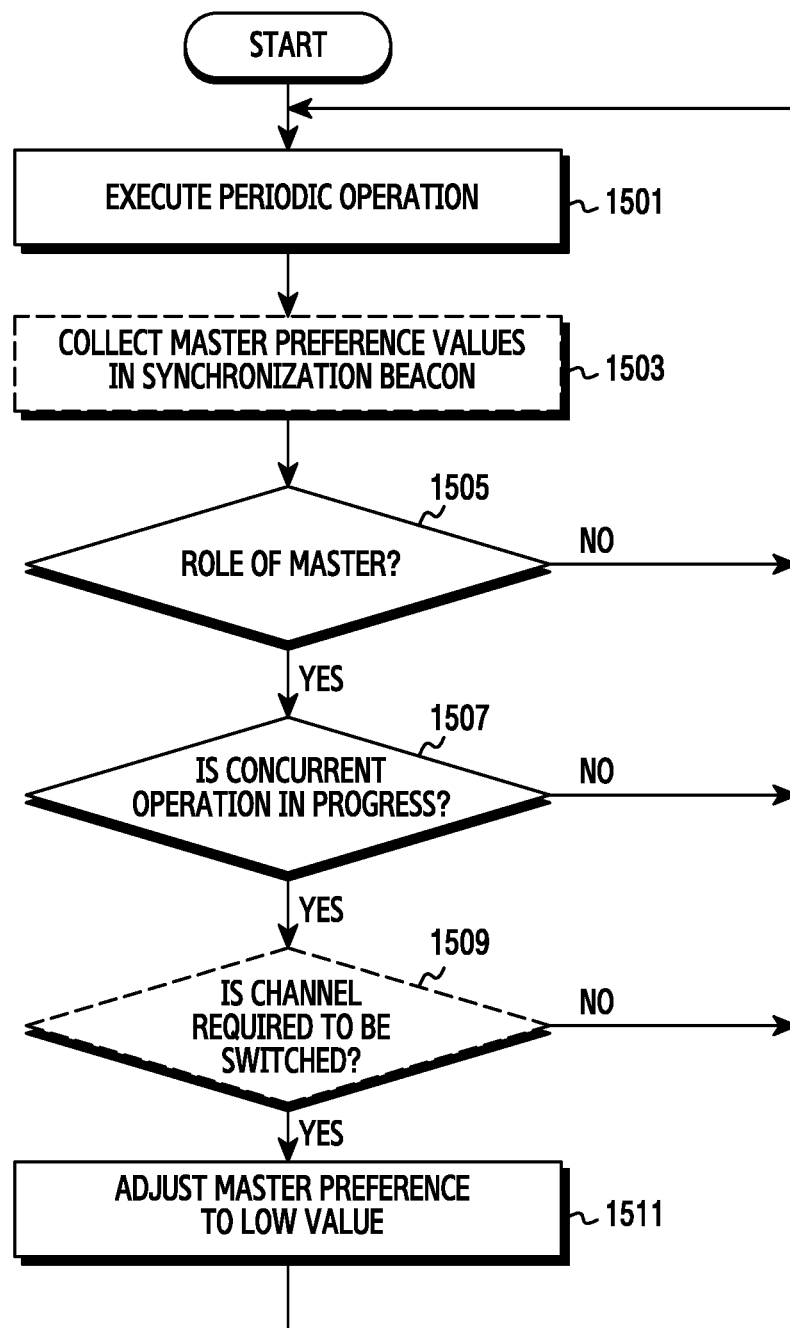
FIG. 15 is a flowchart of a method of adjusting a master preference by a concurrent operation in an electronic device according to an embodiment of the present disclosure.

FIG. 15 is a flowchart of a method in which a master preference is adjusted by a concurrent operation in an electronic device according to an embodiment of the present disclosure. In FIG. 15, the operations indicated with dotted lines may be omitted depending on an embodiment of the present disclosure.

Referring to FIG. 15, the electronic device performs or executes a periodic operation in step 1501. The periodic operation refers to at least one operation of configuring a cluster, and communicating through a synchronized communication section in the cluster. For example, the periodic operation includes at least one of transmitting a discovery beacon, scanning with respect to a discovery beacon transmitted by another device, transmitting a synchronization beacon, or transmitting a service discovery frame. In this case, the discovery beacon and the synchronization beacon may include a reference value to be used in determining a master in the cluster. The reference value may include at least one of a master preference, a random factor, or a part of a MAC address.

Then, the electronic device proceeds to step 1503 to collect the master preference values included in the synchronization beacons. That is, the electronic device receives the synchronization beacons transmitted from one or more of the other devices in the cluster to thereby identify the master preference values in the synchronization beacons. For example, the electronic device may collect the master preference values in DW of zero, i.e., DW0. DW of zero indicates the DW defined to allow all of the devices in the cluster to perform the communication.

Afterwards, the electronic device proceeds to step 1505 to thereby determine whether or not the current role of the electronic device is the master. A single device in the cluster acts as the master. The master transmits the discovery beacon in the section other than the synchronized communication section (e.g., the DW). In addition, the master provides time information as a base for the synchronization to the other devices in the cluster. That is, the master, which provides the time reference of the synchronization, may be referred to as a "reference node." If the electronic device is not the master, the electronic device returns to step 1501.

In contrast, if the electronic device is the master, the electronic device proceeds to step 1507 to thereby determine whether or not the current state is a concurrent operation state. The concurrent operation indicates a post operation in the section other than the synchronized communication section, i.e., the DW. The execution of the concurrent operation may be determined according to the execution of the post operation, the execution of the communication operation using an address different from the device address used in the cluster, or the transmission of the scheduling information on the post operation. If the concurrent operation is not executed, the electronic device returns to step 1501.

In contrast, if the concurrent operation is executed, the electronic device proceeds to step 1509 to thereby determine whether or not channel switching is required. If the post operation is executed in a channel different from the channel used in the communication for the cluster, the electronic device changes the channel for the concurrent operation. Accordingly, the electronic device may compare the channel, through which the post operation is performed with the channel used in the communication for the cluster to determine whether or not the channel is required to be switched. If the channel is not required to be switched, the electronic device returns to step 1501.

In contrast, if the channel is required to be switched, the electronic device proceeds to step 1511 to thereby adjust the master preference. In other words, if the channel used for the post operation is different from the channel used for the communication in the group, the electronic device may adjust the reference value. In this case, the master preference may be adjusted according to a predefined rule. The predefined rule may be defined to adjust the master preference, based on the configurable range of the master preference, or the master preference values of the other devices. For example, the electronic device may reduce the master preference to a value less than the current value in the predefined range (e.g., 0 to 128). For example, the master preference may be adjusted to a minimum value in the configurable range. That is, the master preference may be adjusted to zero, and in this case, the other electronic devices may have lesser master preference values. As another example, the electronic device may adjust the master preference, based on the master preference values of the other electronic devices, which are obtained through the periodic operation. For example, the electronic device may adjust the master preference to be less than an average of master preference values of other electronic devices. Alternatively, the electronic device may adjust the master preference to be less than a minimum master preference value of the other electronic devices. In this case, a difference between the average value or the minimum value and the adjusted value may be determined according to a predefined rule.

Figure 16:
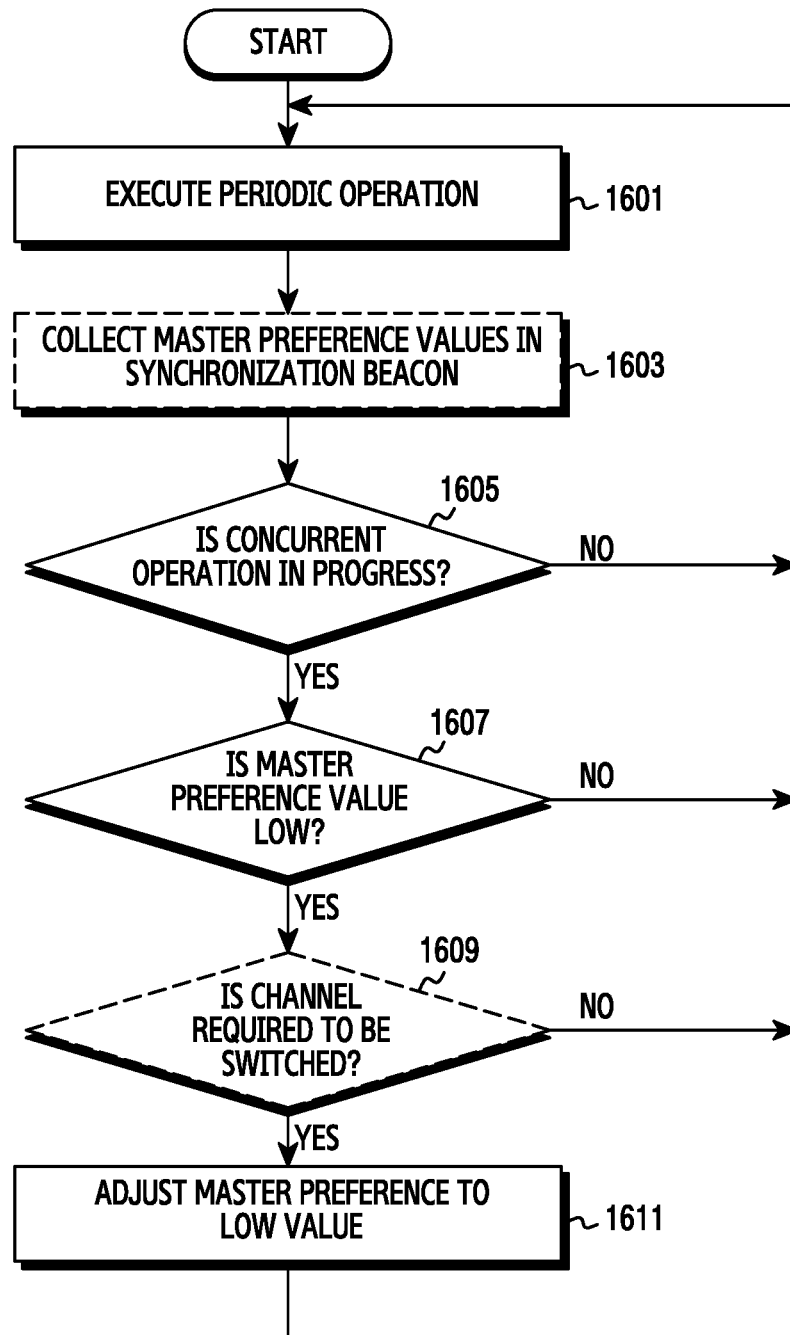
FIG. 16 is a flowchart of a method of adjusting a master preference by a concurrent operation in an electronic device according to another embodiment of the present disclosure.

FIG. 16 is a flowchart in which a master preference is adjusted by a concurrent operation in an electronic device according to an embodiment of the present disclosure. In FIG. 16, the operations indicated with dotted lines may be omitted depending on an embodiment of the present disclosure.

Referring to FIG. 16, the electronic device performs or executes a periodic operation in step 1601. The periodic operation refers to at least one operation of configuring a cluster, and performing a communication through a synchronized communication section in the cluster. For example, the periodic operation includes at least one of transmitting a discovery beacon, scanning with respect to a discovery beacon transmitted by another device, transmitting a synchronization beacon, or transmitting a service discovery frame. In this case, the discovery beacon and the synchronization beacon may include a reference value to be used in determining a master in the cluster. The reference value may include at least one of a master preference, a random factor, or a part of a MAC address.

Then, the electronic device proceeds to step 1603 to collect the master preference values included in the synchronization beacons. That is, the electronic device receives the synchronization beacons transmitted from one or more of the other devices in the cluster to thereby identify the master preference values in the synchronization beacons. For example, the electronic device may collect the master preference values in DW of zero, i.e., DW0. The DW of zero indicates the DW defined to allow all of the devices in the cluster to perform the communication.

Then, the electronic device proceeds to step 1605 to thereby determine whether or not the current state is the concurrent operation state. The concurrent operation indicates a post operation in the section other than the synchronized communication section, i.e., the DW. The execution of the concurrent operation may be determined according to the execution of the post operation, the execution of the communication operation using an address different from the device address used in the cluster, or the transmission of the scheduling information on the post operation. If the concurrent operation is not executed, the electronic device returns to the step 1601.

In contrast, if the concurrent operation is executed, the electronic device proceeds to step 1607 to thereby determine whether or not the master preference has a low value. That is, the electronic device determines whether or not the master preference has ever been adjusted due to the occurrence of the concurrent operation. For example, the electronic device may determine whether or not the master preference has a low value by referring to a record stating that the master preference has or has not ever been adjusted due to the occurrence of the concurrent operation, or by comparing the current value of the master preference with an expected value of the master preference, which is variable depending on the concurrent operation. However, according to an embodiment of the present disclosure, step 1607 may be omitted. That is, the electronic device may proceed to step 1609 regardless of the current value of the master preference.

The electronic device proceeds to step 1609 to thereby determine whether or not the channel is required to be switched. If the post operation is executed in a channel different from the channel used in the communication for the cluster, the electronic device changes the channel for the concurrent operation. Accordingly, the electronic device may compare the channel through which the post operation is performed with the channel used in the communication for the cluster to determine whether or not the channel is required to be switched. If the channel is not required to be switched, the electronic device returns to step 1601.

In contrast, if the channel is required to be switched, the electronic device proceeds to step 1611 to thereby adjust the master preference. In this case, the master preference may be adjusted according to a predefined rule. The predefined rule may be defined to adjust the master preference, based on the configurable range of the master preference, or the master preference values of the other devices. For example, the electronic device may reduce the master preference to a value less than the current value in the predefined range (e.g., 0 to 128). For example, the master preference may be adjusted to a minimum value in the configurable range. That is, the master preference may be adjusted to zero, and in this case, other electronic devices may have lesser master preference values. As another example, the electronic device may adjust the master preference, based on the master preference values of the other electronic devices, which are obtained through the periodic operation. For example, the electronic device may adjust the master preference to be less than an average of master preference values of the other electronic devices. Alternatively, the electronic device may adjust the master preference to be less than a minimum master preference value of the other electronic devices. In this case, a difference between the average value or the minimum value and the adjusted value may be determined according to a predefined rule.

Figure 17:
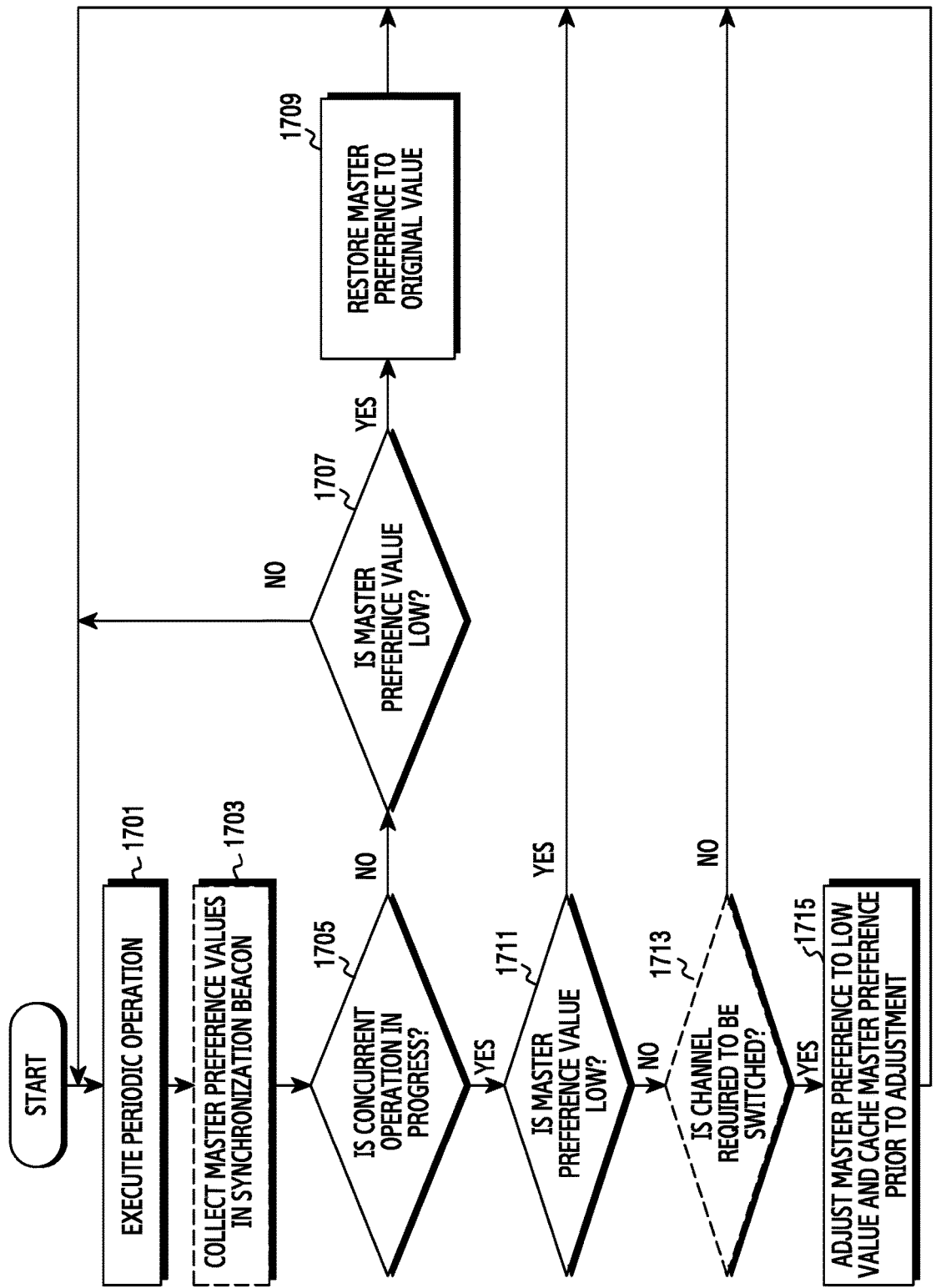
FIG. 17 is a flowchart of adjusting a master preference by a concurrent operation in an electronic device according to an embodiment of the present disclosure.

FIG. 17 is a flowchart in which a master preference is adjusted by a concurrent operation in an electronic device according to an embodiment of the present disclosure. FIG. 17 illustrates an embodiment of the present disclosure in which the master preference is restored according to a termination of a concurrent operation. In FIG. 17, the operations indicated with dotted lines may be omitted depending on an embodiment of the present disclosure.

Referring to FIG. 17, the electronic device performs or executes a periodic operation in step 1701. The periodic operation refers to at least one operation of configuring a cluster, and performing a communication through a synchronized communication section in the cluster. For example, the periodic operation includes at least one of transmitting a discovery beacon, scanning with respect to a discovery beacon transmitted by another device, transmitting a synchronization beacon, or transmitting a service discovery frame. In this case, the discovery beacon and the synchronization beacon may include a reference value to be used in determining a master in the cluster. The reference value may include at least one of a master preference, a random factor, or a part of a MAC address.

Then, the electronic device proceeds to step 1703 to collect the master preference values included in the synchronization beacons. That is, the electronic device receives the synchronization beacons transmitted from one or more of the other devices in the cluster to thereby identify the master preference values in the synchronization beacons. For example, the electronic device may collect the master preference values in DW of zero, i.e., DW0. The DW of zero indicates the DW defined to allow all of the devices in the cluster to perform a communication.

Then, the electronic device proceeds to step 1705 to determine whether or not a current state is the concurrent operation state. The concurrent operation indicates the post operation in the section other than the synchronized communication section, i.e., the DW. The execution of the concurrent operation may be determined according to the execution of the post operation, the execution of the communication operation using an address different from the device address used in the cluster, or the transmission of the scheduling information on the post operation.

If the concurrent operation is not executed, the electronic device proceeds to step 1707 to thereby determine whether or not the master preference has a low value. That is, the electronic device determines whether or not the master preference has ever been adjusted due to the occurrence of the concurrent operation state. For example, the electronic device may determine whether or not the master preference has a low value by referring to a record stating that the master preference has or has not ever been adjusted due to the occurrence of the concurrent operation state, or by comparing the current value of the master preference with an expected value of the master preference, which is variable depending on the concurrent operation. If the master preference value is not low, the electronic device returns to step 1701.

In contrast, if the master preference value is low, the electronic device proceeds to step 1709 to thereby restore the master preference to its original value. In other words, the electronic device restores the master preference to its original value that has been changed into the low value. To this end, in adjusting the master preference value due to the occurrence of the concurrent operation, the electronic device may cache the value prior to the adjustment.

If the concurrent operation is executed in step 1705, the electronic device proceeds to step 1711 to thereby determine whether or not the master preference has a low value. That is, the electronic device determines whether or not the master preference has ever been adjusted due to the occurrence of the concurrent operation state. For example, the electronic device may determine whether or not the master preference has a low value by referring to a record stating that the master preference has or has not ever been adjusted due to the occurrence of the concurrent operation state, or by comparing the current value of the master preference with an expected value of the master preference, which is variable depending on the concurrent operation. However, according to an embodiment of the present disclosure, step 1711 may be omitted. That is, the electronic device may proceed to step 1713 regardless of the current value of the master preference.

The electronic device proceeds to step 1713 to thereby determine whether or not the channel is required to be switched. If the post operation is executed in the channel different from the channel used in the communication for the cluster, the electronic device changes the channel for the concurrent operation. Accordingly, the electronic device may compare the channel through which the post operation is performed with a channel used in the communication for the cluster to determine whether or not the channel is required to be switched. If the channel is not required to be switched, the electronic device returns to step 1701.

In contrast, if the channel is required to be switched, the electronic device proceeds to step 1715 to thereby adjust the master preference. In this case, the master preference may be adjusted according to a predefined rule. The predefined rule may be defined to adjust the master preference, based on a configurable range of the master preference, or the master preference values of the other devices. For example, the electronic device may reduce the master preference to a value less than the current value in the predefined range (e.g., 0 to 128). For example, the master preference may be adjusted to a minimum value in the configurable range. That is, the master preference may be adjusted to zero, and in this case, the other electronic devices may have lesser master preference values. As another example, the electronic device may adjust the master preference, based on the master preference values of the other electronic devices, which are obtained through the periodic operation. For example, the electronic device may adjust the master preference to be less than an average of master preference values of the other electronic devices. Alternatively, the electronic device may adjust the master preference to be less than a minimum master preference value of other electronic devices. In this case, a difference between the average value or the minimum value and the adjusted value may be determined according to a predefined rule. Furthermore, the electronic device may cache the value prior to the adjustment for later restoration.

The master preference may be adjusted according to other causes as well as the concurrent operation. According to an embodiment of the present disclosure, the master preference may be changed according to an operation mode of the processor. The operation mode may be divided into a sleep mode, and a waking mode. The sleep mode indicates a state in which the processor of the electronic device deactivates some of the functions, and operates at a relatively low power consumption level. That is, the sleep mode refers to the state in which all of or some of the functions are deactivated, and the electronic device maintains a minimum power consumption level for detecting a request signal (e.g., an interruption signal) for activating the functions. For example, when some of the functions of the electronic device are not in use, the electronic device may enter the sleep mode. For example, when a displaying means (e.g., a liquid crystal display) is in the off-state, the processor of the electronic device may operate in the sleep mode. In the sleep mode, it is not desirable for the electronic device to transmit the discovery beacon in the section other than the synchronized communication section to thereby bring about an increase in power consumption. Therefore, in the sleep mode, an embodiment of the present disclosure may avoid the role of the master.

Figure 18:
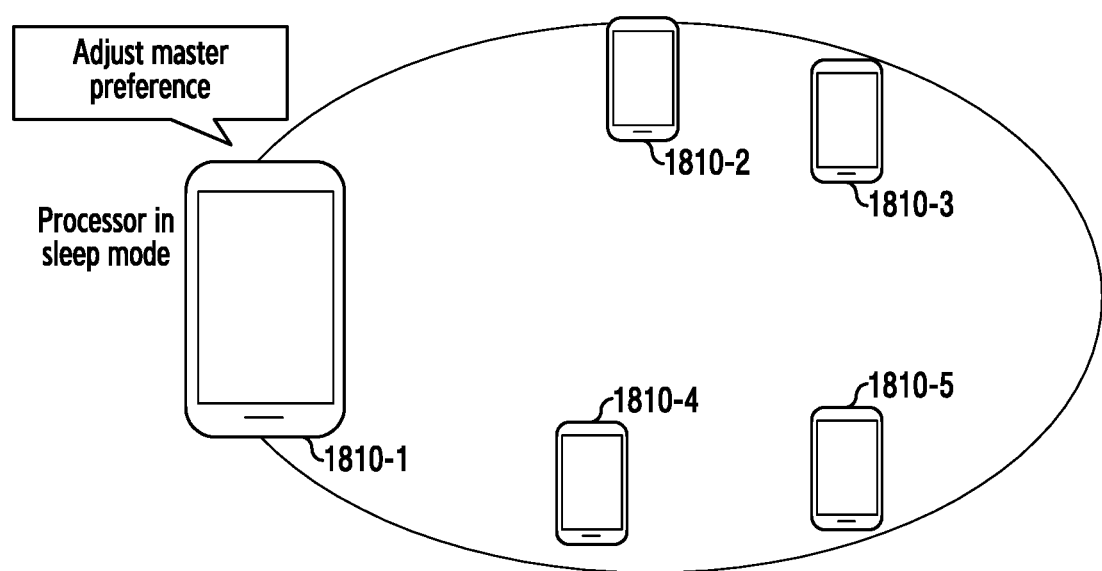
FIG. 18 is a diagram of adjusting a master preference depending on an operation mode of a processor in an electronic device according to an embodiment of the present disclosure.

FIG. 18 is a diagram in which a master preference is adjusted depending on an operation mode of a processor in an electronic device according to an embodiment of the present disclosure.

Referring to FIG. 18, devices 1810-1 to 1810-5 are in a cluster, and transmit/receive beacons and data through a synchronized communication section (e.g., the DW). In this case, the processor of the device 1810-1 is in the sleep mode. Accordingly, the device 1810-1 may adjust a master preference. That is, in the sleep mode, the device 1810-1 may avoid being selected as the master by lowering its master preference. For example, the device 1810-1 may adjust the master preference to a minimum value in a configurable range, or to a value less than an average value or a minimum value of master preference values of the other devices 1810-2 to 1810-5. To this end, the processor of the device 1810-1 may instruct to adjust its master preference before entering the sleep mode, or may define a rule by which its master preference is adjusted when entering the sleep mode.

Figure 19:
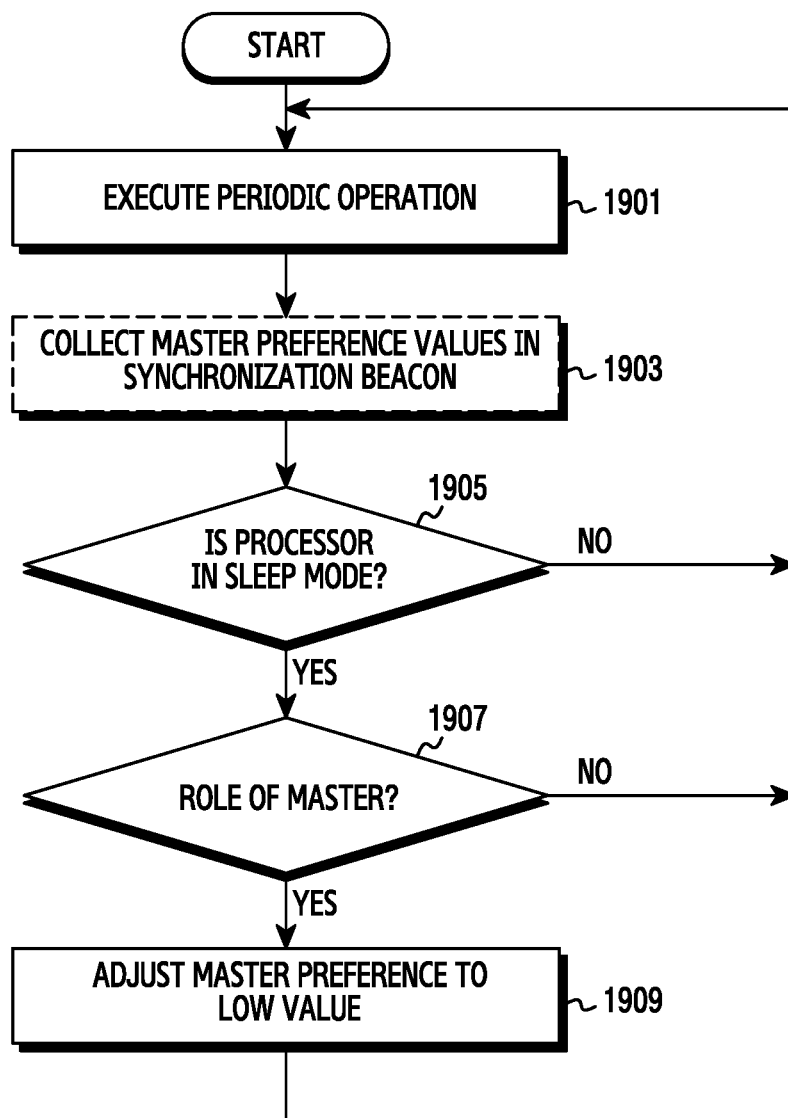
FIG. 19 is a flowchart of a method of adjusting a master preference according to an operation mode of a processor in an electronic device according to an embodiment of the present disclosure.

FIG. 19 is a flowchart of a method in which a master preference is adjusted according to an operation mode of a processor in an electronic device according to an embodiment of the present disclosure. In FIG. 19, the operations indicated with dotted lines may be omitted depending on an embodiment of the present disclosure.

Referring to FIG. 19, the electronic device performs a periodic operation in step 1901. The periodic operation refers to at least one operation of configuring a cluster, and performing a communication through a synchronized communication section in the cluster. For example, the periodic operation includes at least one of transmitting a discovery beacon, scanning with respect to a discovery beacon transmitted by another device, transmitting a synchronization beacon, or transmitting a service discovery frame. In this case, the discovery beacon and the synchronization beacon may include a reference value to be used in determining a master in the cluster. The reference value may include at least one of a master preference, a random factor, or a part of a MAC address.

Then, the electronic device proceeds to step 1903 to collect the master preference values included in the synchronization beacons. That is, the electronic device receives the synchronization beacons transmitted from one or more of the other devices in the cluster to thereby identify the master preference values in the synchronization beacons. For example, the electronic device may collect the master preference values in DW of zero, i.e., DW0. The DW of zero indicates the DW defined to allow all of the devices in the cluster to perform a communication.

Then, the electronic device proceeds to step 1905 to determine whether or not the processor operates in a sleep mode. The electronic device may determine the sleep mode, based on a signal showing the operation state, or a function activated by a processor. If the processor is not in the sleep mode, the electronic device returns to step 1901.

In contrast, if the processor is in the sleep mode, the electronic device proceeds to step 1907 to thereby determine whether or not the current role of the electronic device is the master. A single device in the cluster acts as the master. The master transmits the discovery beacon in the section other than the synchronized communication section (e.g., the DW). In addition, the master provides time information as a base for the synchronization to other devices in the cluster. That is, the master, which provides the time reference of the synchronization, may be referred to as a "reference node." If the electronic device is not the master, the electronic device returns to step 1901. However, according to an embodiment of the present disclosure, step 1907 may be omitted. That is, the electronic device may proceed to step 1909 regardless of the role of the electronic device as the master.

In contrast, if the electronic device is the master, the electronic device proceeds to step 1909 to adjust the master preference. In this case, the master preference may be adjusted according to a predefined rule. The predefined rule may be defined to adjust the master preference, based on a configurable range of the master preference, or the master preference values of the other devices. For example, the electronic device may reduce the master preference to a value less than the current value in a predefined range (e.g., 0 to 128). For example, the master preference may be adjusted to a minimum value in the configurable range. That is, the master preference may be adjusted to zero, and in this case, other electronic devices may have lesser master preference values. As another example, the electronic device may adjust the master preference, based on the master preference values of the other electronic devices, which are obtained through the periodic operation. For example, the electronic device may adjust the master preference to be less than an average of master preference values of the other electronic devices. Alternatively, the electronic device may adjust the master preference to be less than a minimum master preference value of the other electronic devices. In this case, a difference between the average value or the minimum value and the adjusted value may be determined according to a predefined rule.

Figure 20:
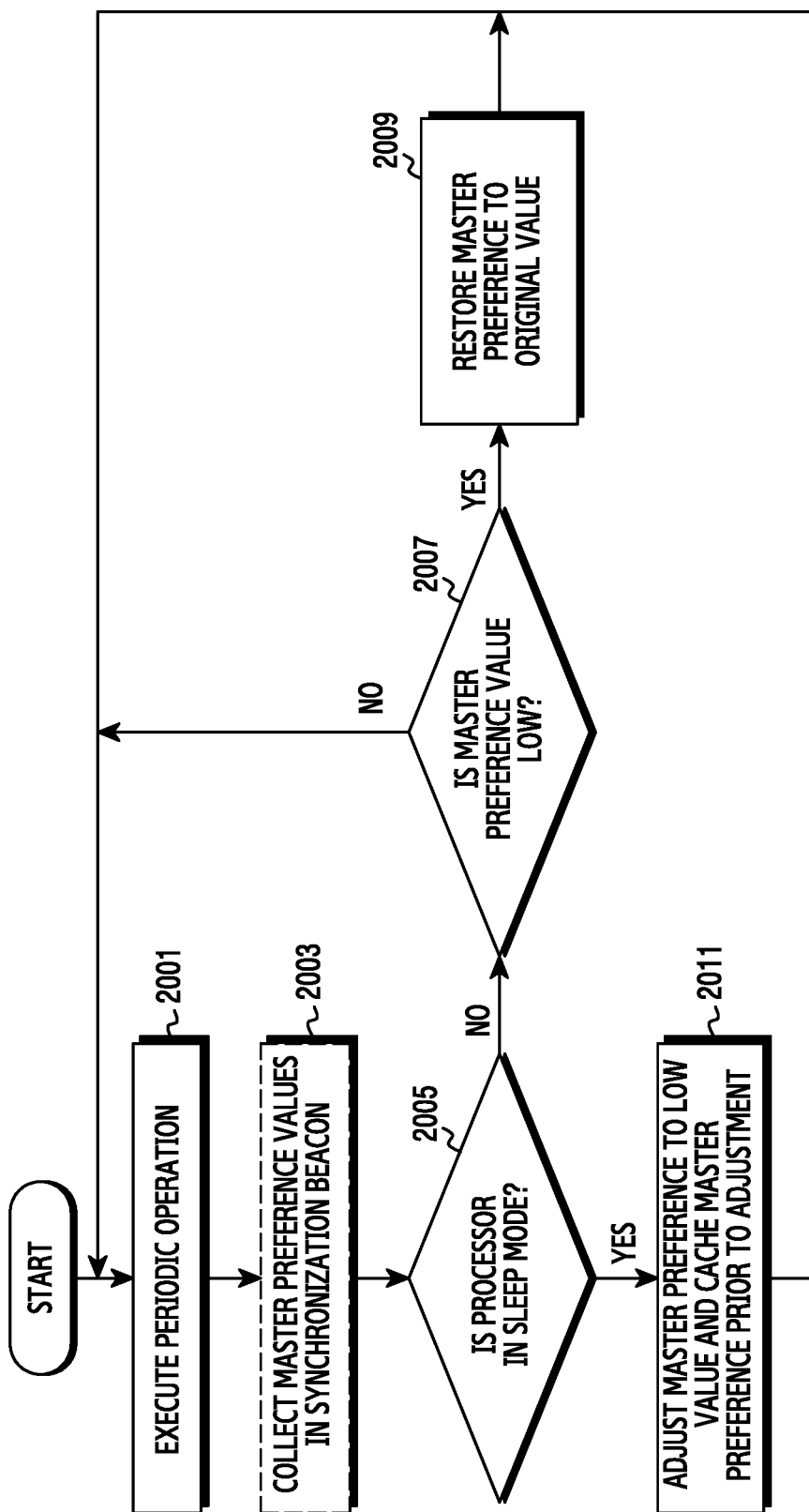
FIG. 20 is a flowchart of a method of adjusting a master preference according to an operation mode of a processor in an electronic device according to an embodiment of the present disclosure.

FIG. 20 is a flowchart of a method in which a master preference is adjusted according to an operation mode of a processor in an electronic device according to an embodiment of the present disclosure. FIG. 20 illustrates an embodiment of the present disclosure in which the master preference is restored according to a termination of a sleep mode. In FIG. 20, the operations indicates with dotted lines may be omitted depending on an embodiment of the present disclosure.

Referring to FIG. 20, the electronic device performs a periodic operation in step 2001. The periodic operation refers to at least one operation of configuring a cluster, and performing a communication through a synchronized communication section in the cluster. For example, the periodic operation includes at least one of transmitting a discovery beacon, scanning with respect to a discovery beacon transmitted by another device, transmitting a synchronization beacon, or transmitting a service discovery frame. In this case, the discovery beacon and the synchronization beacon may include a reference value to be used in determining a master in the cluster. The reference value may include at least one of a master preference, a random factor, or a part of a MAC address.

Then, the electronic device proceeds to step 2003 to collect the master preference values included in the synchronization beacons. That is, the electronic device receives the synchronization beacons transmitted from one or more of the other devices in the cluster to thereby identify the master preference values in the synchronization beacons. For example, the electronic device may collect the master preference values in DW of zero, i.e., DW0. The DW of zero indicates the DW defined to allow all of the devices in the cluster to perform a communication.

Then, the electronic device proceeds to step 2005 to thereby determine whether or not the processor operates in a sleep mode. The electronic device may determine the sleep mode, based on a signal showing the operation state, or a function activated by a processor.

If the processor is not in the sleep mode, the electronic device proceeds to step 2007 to determine whether or not the master preference value has been adjusted to be low. That is, the electronic device determines whether or not the master preference has ever been adjusted due to entering into the sleep mode. For example, the electronic device may determine whether or not the master preference has been adjusted to be a low value by referring to a record stating that the master preference has or has not ever been adjusted due to entering into the sleep mode, or by comparing the current value of the master preference with an expected value of the master preference, which is variable depending on entering into the sleep mode. If the master preference has not been adjusted to be the low value, the electronic device returns to step 2001.

In contrast, if the master preference has been adjusted to be the low value, the electronic device proceeds to step 2009 to restore the master preference to its original value. In other words, the electronic device restores the master preference to the value that has been changed into the low value. To this end, in adjusting the master preference value due to the occurrence of the concurrent operation, the electronic device may cache the value prior to the adjustment.

If the processor is in the sleep mode in step 2005, the electronic device proceeds to step 2011 to thereby adjust the master preference. In this case, the master preference may be adjusted according to a predefined rule. The predefined rule may be defined to adjust the master preference, based on a configurable range of the master preference, or the master preference values of the other devices. For example, the electronic device may reduce the master preference to a value less than the current value in a predefined range (e.g., 0 to 128). For example, the master preference may be adjusted to a minimum value in the configurable range. That is, the master preference may be adjusted to zero, and in this case, the other electronic devices may have lesser master preference values. As another example, the electronic device may adjust the master preference, based on the master preference values of the other electronic devices, which are obtained through the periodic operation. For example, the electronic device may adjust the master preference to be less than an average of master preference values of the other electronic devices. Alternatively, the electronic device may adjust the master preference to be less than a minimum master preference value of the other electronic devices. In this case, a difference between the average value or the minimum value and the adjusted value may be determined according to a predefined rule. Furthermore, the electronic device may cache the value prior to the adjustment for later restoration.

In an embodiment of the present disclosure, the electronic device may temporarily avoid being selected as a master by adjusting a variable for determining the master in a cluster, i.e., the master preference.

However, the adjustment of the master preference does not definitely avoid being selected as the master, because the master preference of another device may be lower or equal to the adjusted master preference. In this case, in spite of the adjustment of the master preference, the electronic device may be given the role of the master.

If the electronic device cannot avoid the role of the master because of the reason mentioned above or other reasons, the electronic device may stop transmitting the discovery beacon for the interval of performing the post operation, or in a certain period.

For example, in the case of a cluster comprised of a smart phone and a wearable device, a WiFi communication may be performed as the post operation between two devices. In this case, the smart phone may operate as the master. The cluster comprised of the smart phone and the wearable device may not require additional communication with other devices. Accordingly, the smart phone may operate as the master while the transmission of the discovery beacon is omitted in all of or some of the sections. In this case, the adjustment of the master preference may be omitted as well.

In addition, as mentioned above, if the post operation performed in the section other than the synchronized communication section uses the same channel as that for the communication in the synchronized communication section, the channel is not required to be switched. In this case, the electronic device may not avoid the role of the master. According to another embodiment of the present disclosure, the electronic device may perform the post operation in the channel for the cluster without avoiding the master.

The operations of avoiding the master, stopping the transmission of the discovery beacon in part, and switching the channel of the post operation may be applied separately, or may be conducted through a combination thereof.

Figure 21:
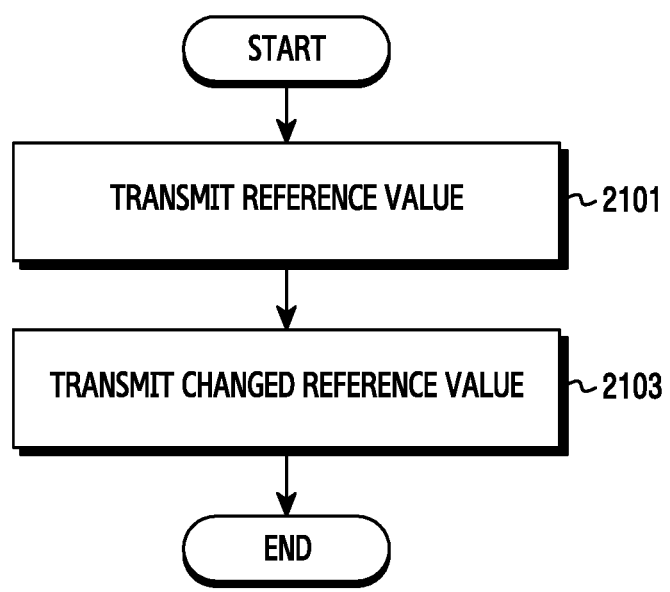
FIG. 21 is a flowchart of a method of an electronic device according to an embodiment of the present disclosure.

FIG. 21 is a flowchart of a method of an electronic device according to an embodiment of the present disclosure.

Referring to FIG. 21, the electronic device transmits a reference value in step 2101. The reference value is a variable to determine a reference node. For example, the reference value may be a master preference. Alternatively, the reference value may include a random factor, or a part of a MAC address. The reference value may be transmitted through a signal (e.g., a synchronization beacon) transmitted by the electronic device. The reference value may be repeatedly transmitted through different synchronized sections.

The electronic device proceeds to step 2103 to transmit a changed reference value. That is, the electronic device detects predefined circumstances to change the reference value, and transmits the changed reference value. For example, the predefined circumstances may include the execution of a post operation. In this case, the post operation refers to a communication performed in a section other than a synchronized communication section in a cluster. In this case, the post operation is executed using an address different from that of the communication for the cluster, so the post operation may indicate the communication operation using a different address. Alternatively, the predefined circumstances may include the entry of the processor of the electronic device into the sleep mode.

The electronic device may transmit the changed reference value, and then may receive a reference value of one or more of the other devices in the cluster. In addition, the electronic device, based on its own reference value and the reference values of one or more of the other devices, may determine the device to operate as a master. In this case, if the electronic device is not selected as the master, the electronic device may not transmit the discovery beacon in the section other than the synchronized communication section.

Figure 22:
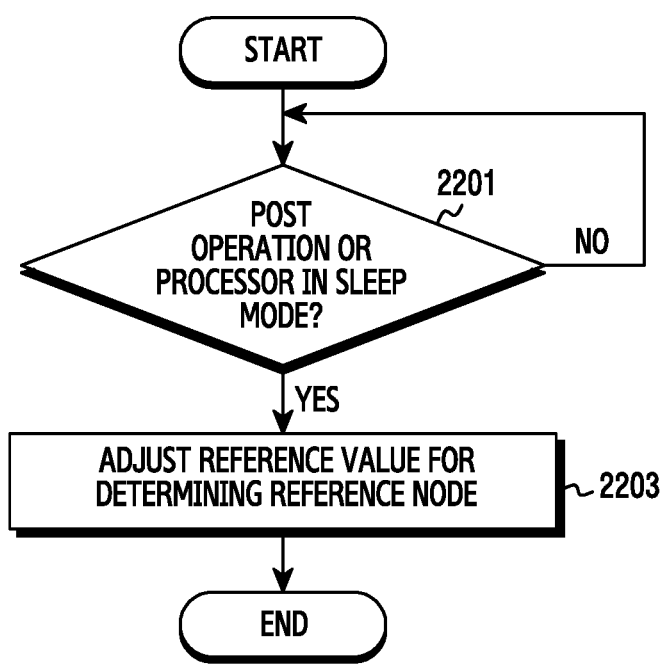
FIG. 22 is a flowchart of a method of an electronic device according to an embodiment of the present disclosure.

FIG. 22 is a flowchart of a method of an electronic device according to an embodiment of the present disclosure.

Referring to FIG. 22, the electronic device determines whether or not a post operation is executed, or whether or not a processor is in a sleep mode in step 2201. In this case, the post operation refers to a communication performed in a section other than a synchronized communication section in a cluster. In this case, the post operation is executed using an address different from a communication for the cluster, so the post operation may indicate the communication operation using a different address. In addition, the sleep mode refers to a state in which all of or some of the functions are deactivated, and the electronic device maintains a minimum power consumption level for detecting a request signal (e.g., an interruption signal) for activating the functions.

The electronic device proceeds to step 2203 to adjust the reference value for determining a reference node. For example, the reference value may be a master preference. Alternatively, the reference value may include a random factor, or a part of a MAC address. The reference value may be adjusted according to a predefined rule. The predefined rule may be defined to adjust the reference value, based on a configurable range of the master preference, or the master preference values of the other devices. For example, the electronic device may reduce the reference value to a value less than the current value in a predefined range (e.g., 0 to 128). For example, the reference value may be adjusted to a minimum value (e.g., 0) in the configurable range. As another example, the electronic device may adjust the reference value, based on the reference values of the other electronic devices, which are obtained through the periodic operation. For example, the electronic device may adjust the reference value to be less than an average or a minimum of reference values of the other electronic devices. In this case, a difference between the average value or the minimum value and the adjusted value may be determined according to a predefined rule.

In the embodiment of the present disclosure illustrated in FIG. 22, the electronic device adjusts the reference value according to the execution of the post operation. According to an embodiment of the present disclosure, the electronic device may adjust the reference value, based on whether or not the channel used for the post operation is different from the channel used for the communication in the group, or whether or not the electronic device is currently the reference node, as well as the execution of the post operation. For example, if the electronic device executes the post operation, and if the channel used for the post operation is different from the channel used for the communication in the group, the electronic device may adjust the reference value. As another example, if the electronic device executes the post operation, and if the electronic device is the current reference node, the electronic device may adjust the reference value. For example, if the electronic device executes the post operation, if the channel used for the post operation is different from the channel used for the communication in the group, and if the electronic device is the current reference node, the electronic device may adjust the reference value.

When the circumstances (e.g., the execution of the post operation, or the sleep mode) for the adjustment of the reference value are completed, the electronic device may restore the reference value to its original value. To this end, the electronic device may cache the reference value before the adjustment.

As described above, an electronic device, according to an embodiment of the present disclosure, may avoid being selected as a master by adjusting a reference value.

That is, an operation method of the electronic device may include transmitting the reference value for determining a reference node in a cluster including a plurality of electronic devices; transmitting the reference value changed due to the execution of a post operation in a section other than a synchronized communication section in the cluster and determining whether or not to operate as the reference node, based on the changed reference value. In this case, the reference node refers to a node that transmits signals for other electronic devices other than the group, in a section other than the synchronized communication section.

Furthermore, the operation method of the electronic device may further include adjusting a reference value before transmitting a changed reference value. In addition, the operation of adjusting the reference value, if a channel used for a post operation is different from a channel used for a communication in the group, may further include adjusting the reference value. Alternatively, the operation of adjusting the reference value, if the electronic device operates as the reference node, may include adjusting the reference value. Alternatively, the operation of adjusting the reference value may include determining the reference value as one of a value less than the current value, a minimum value in a configurable range, a value less than an average of the reference values of one or more of other devices in the group, or a value less than a minimum of the reference values of one or more of other devices in the group.

In addition, the operation method may include terminating a post operation, and restoring a changed reference value to its original value. In addition, the operation method may further include transmitting the reference value changed due to the entry of the processor of the electronic device into a sleep mode. In this case, the operation method may further include restoring the changed reference value to its original value when the sleep mode of the processor is terminated.

Additionally, the operation method may further include transmitting the changed reference value, based on the remaining power of the battery of the electronic device.

Methods, according to various embodiments, disclosed in claims and/or the present disclosure may be implemented in the form of hardware, software, or a combination thereof.

A module or programming module according to an embodiment of the present disclosure may include one or more of the above-described elements, may omit some elements, or may further include additional elements. The operations performed by the module, the programming module, or the other elements according to an embodiment of the present disclosure may be performed serially, in parallel, repeatedly, or heuristically. In addition, some operations may be performed in a different order or may be omitted, and additional operations may be added.

In the implementation of software, a non-transitory computer-readable storage medium for storing one or more programs (e.g. software modules) may be provided. The one or more programs stored in the non-transitory computer-readable storage medium may be configured for execution by one or more processors within the electronic device. The at least one program may include instructions that cause the electronic device to perform the methods according to an embodiment of the present disclosure as defined by the appended claims and their equivalents.

The programs (e.g. software modules or software) may be stored in non-volatile memories including a random access memory and a flash memory, a ROM, an EEPROM, a magnetic disc storage device, a CD-ROM, DVDs, or other types of optical storage devices, or a magnetic cassette. Alternatively, any combination of some or all of the non-volatile memories may form a memory in which the program is stored. Further, a plurality of such memories may be included in the electronic device.

In addition, the programs may be stored in an attachable storage device which may access the electronic device through communication networks such as an internet, an intranet, an LAN, a wide area LAN (WLAN), a storage area network (SAN) or a combination thereof. Such a storage device may access the electronic device via an external port. Further, a separate storage device on the communication network may access a portable electronic device.

In an embodiment of the present disclosure, elements have been represented in the singular or plural. However, the singular form or plural form is selected for convenience of description suitable for the presented situation, and an embodiment of the present disclosure is not limited to a single element or multiple elements thereof. Further, either multiple elements expressed in the present disclosure may be configured into a single element or a single element in the description may be configured into multiple elements.

Although an embodiment of the present disclosure has been described, the present disclosure may be modified in various forms without departing from the scope and spirit of the present disclosure. Therefore, the scope of the present disclosure is not limited to an embodiment of the present disclosure, but is defined by the appended claims and equivalents thereof.

What is claimed is:

1. An electronic device in a neighbor awareness networking (NAN) cluster, the electronic device comprising:
   a wireless fidelity (Wi-Fi) communication circuitry;
   a memory configured to store instructions; and
   a processor configured to execute the instructions, which instruct the processor to:
      while the electronic device operates as a master of the NAN cluster based on a first master preference, control the Wi-Fi communication circuitry to transmit discovery signals outside of discovery windows (DWs),
      while transmitting the discovery signals outside of the DWs, determine to switch a state of the processor from a wake-up state to a sleep state,
      based on the determination, change control information for the NAN cluster, wherein the changed control information for the NAN cluster includes data regarding a second master preference that is distinct from the first master preference, and
      after providing the changed control information to the Wi-Fi communication circuitry, switch the state of the processor to the sleep state,
   wherein the Wi-Fi communication circuitry is configured to:
      while the processor is in the sleep state switched from the wake-up state, transmit the changed control information that includes the data regarding the second master preference.

2. The electronic device of claim 1, further comprising a display,
   wherein the display is in a turn-off state or a low power state while the processor is in the sleep state.

3. The electronic device of claim 1, wherein the electronic device operates as a non-master of the NAN cluster if at least one device that has a master preference higher than the second master preference exists in the NAN cluster.

4. The electronic device of claim 1, wherein the instructions further instruct the processor to:
   receive, in at least one of the DWs, a synchronization signal including data regarding a master preference of another electronic device that operates as a non-master in the NAN cluster; and
   identify the second master preference based on the data regarding the master preference of the other electronic device in the NAN cluster.

5. The electronic device of claim 1, wherein the Wi-Fi communication circuitry is further configured to:
   while the processor is in the sleep state, transmit, in at least one of the DWs, a synchronization signal including the changed control information that includes the data regarding the second master preference.

6. The electronic device of claim 1, wherein each of the first and second master preferences is usable for determining a master in the NAN cluster, and
   wherein each of the discovery signals is usable for notifying a presence of the NAN cluster.

7. The electronic device of claim 1, wherein the instructions further instruct the processor to:
   based on the determination, determine to defer transmissions of the discovery signals outside of the DWs instead of changing the control information for the NAN cluster, and
   after determining to defer the transmissions of the discovery signals outside of the DWs, switch the state of the processor from the wake-up state to the sleep state, and
   wherein the Wi-Fi communication circuitry is further configured to:
      defer the transmissions of the discovery signals outside of the DWs while the processor is in the sleep state.

8. A method executed in an electronic device including a processor and a wireless fidelity (Wi-Fi) communication circuitry in a neighbor awareness networking (NAN) cluster, the method comprising:
   while the electronic device operates as a master of the NAN cluster based on a first master preference, transmitting discovery signals outside of discovery windows (DWs) by using the Wi-Fi communication circuitry;
   while transmitting the discovery signals outside of the DWs, determining to switch a state of the processor from a wake-up state to a sleep state;
   based on the determination, changing control information for the NAN cluster by using the processor that is in the wake-up state, wherein the changed control information for the NAN cluster includes data regarding a second master preference distinct from the first master preference;
   after providing the changed control information to the Wi-Fi communication circuitry by using the processor, switching the state of the processor to the sleep state; and
   while the processor is in the sleep state switched from the wake-up state, transmitting the changed control information that includes the data regarding the second master preference by using the Wi-Fi communication circuitry.

9. The method of claim 8, wherein a display of the electronic device is in a turn-off state or a low power state while the processor is in the sleep state.

10. The method of claim 8, wherein the electronic device operates as a non-master of the NAN cluster if at least one device that has a master preference higher than the second master preference exists in the NAN cluster.

11. The method of claim 8, further comprising:
   receiving, in at least one of the DWs, a synchronization signal including data regarding a master preference of another electronic device that operates as a non-master in the NAN cluster by using the Wi-Fi communication circuitry; and
   identifying the second master preference based on the data regarding the master preference of the other electronic device in the NAN cluster.

12. The method of claim 8, wherein transmitting the changed control information comprises:
   while the processor is in the sleep state, transmitting, in at least one of the DWs, a synchronization signal including the changed control information that includes the data regarding the second master preference by using the Wi-Fi communication circuitry.

13. The method of claim 8, wherein each of the first and second master preferences is usable for determining a master in the NAN cluster, and
   wherein each of the discovery signals is usable for notifying a presence of the NAN cluster.

14. The method of claim 8, further comprising:
   based on the determination, determining to defer transmissions of the discovery signals outside of the DWs instead of changing the control information for the NAN cluster by using the processor being in the wake-up state;
   after determining to defer the transmissions of the discovery signals outside of the DWs, switching the state of the processor from the wake-up state to the sleep state; and
   deferring the transmissions of the discovery signals outside of the DWs by using the Wi-Fi communication circuitry while the processor is in the sleep state.

15. A non-transitory computer readable medium storing one or more programs, the one or more programs comprising instruction which, when executed by an electronic device with a wireless fidelity (Wi-Fi) communication circuitry and a processor, cause the electronic device to:
   while the electronic device operates as a master of the NAN cluster based on a first master preference, control the Wi-Fi communication circuitry to transmit discovery signals outside of discovery windows (DWs) by using the processor being in a wake-up state;
   while transmitting the discovery signals outside of the DWs, determine to switch a state of the processor from the wake-up state to a sleep state by using the processor being in the wake-up state;
   based on the determination, change control information for the NAN cluster by using the processor being in the wake-up state, wherein the changed control information for the NAN cluster includes data regarding a second master preference distinct from the first master preference;
   after providing the changed control information to the Wi-Fi communication circuitry, switch the state of the processor to the sleep state; and while the processor is in the sleep state switched from the wake-up state, transmitting the changed control information that includes the data regarding the second master preference by using the Wi-Fi communication circuitry.

16. The non-transitory computer readable medium of claim 15, wherein a display of the electronic device is in a turn-off state or a low power state while the processor is in the sleep state.

17. The non-transitory computer readable medium of claim 15, wherein the electronic device operates as a non-master of the NAN cluster if at least one device that has a master preference higher than the second master preference exists in the NAN cluster.

18. The non-transitory computer readable medium of claim 15, wherein the one or more programs comprises instructions which, when executed by the electronic device, further cause the electronic device to:
receive, in at least one of the DWs, a synchronization signal including data regarding a master preference of another electronic device that operates as a non-master in the NAN cluster by using the Wi-Fi communication circuitry, and
identify the second master preference based on the data regarding the master preference of the other electronic device in the NAN cluster by using the processor being in the wake-up state.

19. The non-transitory computer readable medium of claim 15, wherein the one or more programs comprises instructions which, when executed by the electronic device, cause the electronic device to:
while the processor is in the sleep state, transmit, in at least one of the DWs, a synchronization signal including the changed control information that includes the data regarding the second master preference by using the Wi-Fi communication circuitry.

20. The non-transitory computer readable medium of claim 15, wherein each of the first and second master preferences is usable for determining a master in the NAN cluster, and
wherein each of the discovery signals is usable for notifying a presence of the NAN cluster.

* * * * *